US012457288B2

(12) United States Patent
Tokuyama

(10) Patent No.: US 12,457,288 B2
(45) Date of Patent: Oct. 28, 2025

(54) REMOTE CONTROL DEVICE, INFORMATION PROCESSING METHOD AND RECORDING MEDIUM

(71) Applicant: Masaaki Tokuyama, Tokyo (JP)

(72) Inventor: Masaaki Tokuyama, Tokyo (JP)

( * ) Notice: Subject to any disclaimer, the term of this patent is extended or adjusted under 35 U.S.C. 154(b) by 803 days.

(21) Appl. No.: 17/606,379

(22) PCT Filed: Apr. 14, 2020

(86) PCT No.: PCT/JP2020/016403
§ 371 (c)(1),
(2) Date: Sep. 19, 2022

(87) PCT Pub. No.: WO2020/218084
PCT Pub. Date: Oct. 29, 2020

(65) Prior Publication Data
US 2022/0417359 A1    Dec. 29, 2022

(30) Foreign Application Priority Data
Apr. 26, 2019  (JP) .................................. 2019-086866

(51) Int. Cl.
*H04M 1/72448*  (2021.01)
*G06F 21/32*  (2013.01)
(Continued)

(52) U.S. Cl.
CPC ...... *H04M 1/724631* (2022.02); *G06F 21/32* (2013.01); *H04M 1/72454* (2021.01)

(58) Field of Classification Search
CPC .............. G06F 21/32; H04M 1/72454; H04M 1/724631; H04M 1/724098; H04M 1/72415; H04Q 9/00
See application file for complete search history.

(56) References Cited

U.S. PATENT DOCUMENTS 5,852,630 A * 12/1998 Langberg ............ H04L 27/2647
375/219
8,219,840 B1    7/2012 Nanda et al.
(Continued)

FOREIGN PATENT DOCUMENTS

CN        101937495 A    1/2011
CN        103339634 A    10/2013
(Continued)

OTHER PUBLICATIONS

Chinese Office Action issued in corresponding CN Appl. Ser. No. 202080055264.0 dated Jun. 1, 2022 (27 pages).
(Continued)

*Primary Examiner* — Siu M Lee
(74) *Attorney, Agent, or Firm* — Foley & Lardner LLP

(57) ABSTRACT

A remote control device is realized by introducing an application into a mobile terminal (1). A terminal controller (18) of the remote control device automatically authenticates a user based on biometric information of the user and an operation mode of a terminal by the user. The terminal controller (18) displays an operation menu for selecting an instruction for a control target device on a display (19). When the user touches a button on the operation menu, the terminal controller (18) authenticates the user, and, if the authentication is successful, the terminal controller (18) transmits a signal instructing an operation indicated by the touched button to the control target device via a near field communicator (10).

14 Claims, 29 Drawing Sheets

(51) Int. Cl.
*H04M 1/72454* (2021.01)
*H04M 1/72463* (2021.01)

(56) References Cited

U.S. PATENT DOCUMENTS

| | | | |
|---|---|---|---|
| 8,625,796 | B1 | 1/2014 | Ben Ayed |
| 8,806,227 | B2 | 8/2014 | Grinchuk et al. |
| 8,925,058 | B1 | 12/2014 | Dotan et al. |
| 8,943,309 | B1 | 1/2015 | Schilder et al. |
| 9,119,539 | B1 | 9/2015 | Dotan et al. |
| 9,158,904 | B1 | 10/2015 | Ross et al. |
| 9,456,343 | B1 | 9/2016 | Mihalache et al. |
| 9,734,419 | B1 | 8/2017 | Ye et al. |
| 9,934,372 | B1 | 4/2018 | Cornelius et al. |
| 10,097,527 | B2 | 10/2018 | Brown et al. |
| 10,142,577 | B1* | 11/2018 | Laird ............ H04N 21/42222 |
| 10,354,126 | B1 | 7/2019 | Nagalla |
| 10,452,823 | B2 | 10/2019 | Tokuyama |
| 10,547,610 | B1 | 1/2020 | Faibish et al. |
| 10,755,512 | B1 | 8/2020 | Fernandez et al. |
| 10,778,450 | B1 | 9/2020 | Griffin et al. |
| 11,288,346 | B1 | 3/2022 | Zubovsky et al. |
| 11,341,573 | B1 | 5/2022 | Fiedler et al. |
| 11,991,249 | B2 | 5/2024 | Deng |
| 2002/0138761 | A1 | 9/2002 | Kanemaki et al. |
| 2005/0196131 | A1* | 9/2005 | Narusawa ............ G10H 1/0083 |
| | | | 386/241 |
| 2005/0237957 | A1* | 10/2005 | Autret ................ G07C 9/00857 |
| | | | 370/310 |
| 2006/0015725 | A1 | 1/2006 | Voice et al. |
| 2006/0268875 | A1 | 11/2006 | Hanner |
| 2007/0126552 | A1* | 6/2007 | Fitzgibbon ............ G08C 17/02 |
| | | | 340/5.71 |
| 2007/0283418 | A1 | 12/2007 | Chen et al. |
| 2009/0150320 | A1 | 6/2009 | Geppert |
| 2009/0249460 | A1 | 10/2009 | Fitzgerald et al. |
| 2009/0249478 | A1 | 10/2009 | Rosener et al. |
| 2010/0058460 | A1 | 3/2010 | Kaiser et al. |
| 2010/0064365 | A1 | 3/2010 | Kanduri et al. |
| 2011/0293095 | A1 | 12/2011 | Ben Ayed |
| 2012/0011575 | A1 | 1/2012 | Cheswick et al. |
| 2012/0159600 | A1 | 6/2012 | Takagi |
| 2013/0055348 | A1 | 2/2013 | Strauss et al. |
| 2013/0167215 | A1 | 6/2013 | Yang |
| 2013/0182279 | A1 | 7/2013 | Yano |
| 2013/0283372 | A1 | 10/2013 | Tsukamoto et al. |
| 2014/0282868 | A1 | 9/2014 | Sheller et al. |
| 2015/0121544 | A1 | 4/2015 | He |
| 2015/0161370 | A1 | 6/2015 | North et al. |
| 2015/0193669 | A1 | 7/2015 | Gu et al. |
| 2015/0312243 | A1 | 10/2015 | Ponsford et al. |
| 2015/0339472 | A1 | 11/2015 | Baughman et al. |
| 2015/0379254 | A1 | 12/2015 | Matsuda et al. |
| 2016/0134608 | A1 | 5/2016 | Hughes |
| 2016/0212113 | A1 | 7/2016 | Banerjee |
| 2016/0275324 | A1 | 9/2016 | Powell |
| 2016/0381251 | A1 | 12/2016 | Shimazaki |
| 2017/0063852 | A1 | 3/2017 | Azar et al. |
| 2018/0020349 | A1* | 1/2018 | Tyagi ................ H04W 12/068 |
| 2018/0035013 | A1 | 2/2018 | Share |
| 2018/0041510 | A1 | 2/2018 | Burch et al. |
| 2018/0121684 | A1 | 5/2018 | Goldberg et al. |
| 2018/0137265 | A1* | 5/2018 | Tokuyama ............ H04M 1/67 |
| 2018/0203600 | A1 | 7/2018 | Hajimusa et al. |
| 2018/0224989 | A1 | 8/2018 | Deasy et al. |
| 2018/0249070 | A1 | 8/2018 | Lau et al. |
| 2018/0260567 | A1 | 9/2018 | Ullom |
| 2018/0330068 | A1 | 11/2018 | Mori |
| 2019/0018942 | A1 | 1/2019 | Takada |
| 2019/0026456 | A1 | 1/2019 | Hon et al. |
| 2019/0052686 | A1 | 2/2019 | Deng |
| 2019/0080592 | A1* | 3/2019 | Filatova ................ G08C 23/04 |
| 2019/0130082 | A1 | 5/2019 | Alameh et al. |
| 2019/0130083 | A1 | 5/2019 | Agassy et al. |
| 2019/0132482 | A1 | 5/2019 | Sue |
| 2019/0180039 | A1 | 6/2019 | Considine et al. |
| 2019/0196755 | A1 | 6/2019 | Nishi |
| 2019/0207975 | A1 | 7/2019 | Wardman et al. |
| 2019/0238533 | A1 | 8/2019 | Pointner et al. |
| 2019/0258788 | A1 | 8/2019 | Hyun et al. |
| 2019/0268325 | A1 | 8/2019 | Roper et al. |
| 2019/0297134 | A1* | 9/2019 | Gold ..................... G06F 3/0481 |
| 2019/0334921 | A1 | 10/2019 | Pattar et al. |
| 2019/0368287 | A1 | 12/2019 | Shekhar et al. |
| 2020/0045038 | A1 | 2/2020 | Mumma et al. |
| 2020/0062218 | A1* | 2/2020 | Lee ..................... G07C 9/00309 |
| 2020/0151430 | A1 | 5/2020 | Hassan et al. |
| 2020/0202813 | A1 | 6/2020 | Liu |
| 2020/0213298 | A1 | 7/2020 | Ericson |
| 2020/0274704 | A1 | 8/2020 | Matsui et al. |
| 2020/0322792 | A1 | 10/2020 | Shimada |
| 2020/0334683 | A1 | 10/2020 | Zhuang et al. |
| 2020/0380523 | A1 | 12/2020 | Agrawal et al. |
| 2021/0192183 | A1 | 6/2021 | Hasegawa et al. |
| 2022/0286451 | A1 | 9/2022 | Tokuyama |
| 2022/0335111 | A1 | 10/2022 | Lee |

FOREIGN PATENT DOCUMENTS

| | | | |
|---|---|---|---|
| CN | 104618784 A | | 5/2015 |
| JP | 2001-338295 A | | 12/2001 |
| JP | 2004-054496 A | | 2/2004 |
| JP | 2005-122700 A | | 5/2005 |
| JP | 2005-141436 A | | 6/2005 |
| JP | 2005-173930 | | 6/2005 |
| JP | 2006-259925 A | | 9/2006 |
| JP | 2008-310743 A | | 12/2008 |
| JP | 2010-074640 | | 4/2010 |
| JP | 2011-118561 A | | 6/2011 |
| JP | 2011-193426 | | 9/2011 |
| JP | 2016-040684 A | | 3/2016 |
| JP | 2018-507461 A | | 3/2018 |
| JP | 2018-120384 A | | 8/2018 |
| JP | 2019-021055 A | | 2/2019 |
| WO | WO-2016/175333 | | 11/2016 |
| WO | WO-2016/175334 A1 | | 11/2016 |
| WO | WO-2016175333 A1 * | 11/2016 | .............. G06F 21/32 |

OTHER PUBLICATIONS

International Search Report and Written Opinion DTD Apr. 7, 2020; 8 pgs.
International Search Report and Written Opinion dated Jul. 14, 2021, PCT Application No. PCT/JP2020/016403, 6 pages.
International Search Report and Written Opinion dated Oct. 29, 2020, in related PCT Application No. PCT/JP2020/013126, 7 pages.
Non-Final Office Action on U.S. Appl. No. 17/631,294 DTD Aug. 9, 2022.
Notice of Allowance on U.S. Appl. No. 17/631,294 DTD Nov. 23, 2022.
Office Action issued in connection with Chinese Appl. No. 202080030710.2 dated Sep. 4, 2023.
Non-Final Office Action on U.S. Appl. No. 17/605,970 DTD Jun. 10, 2024.

* cited by examiner

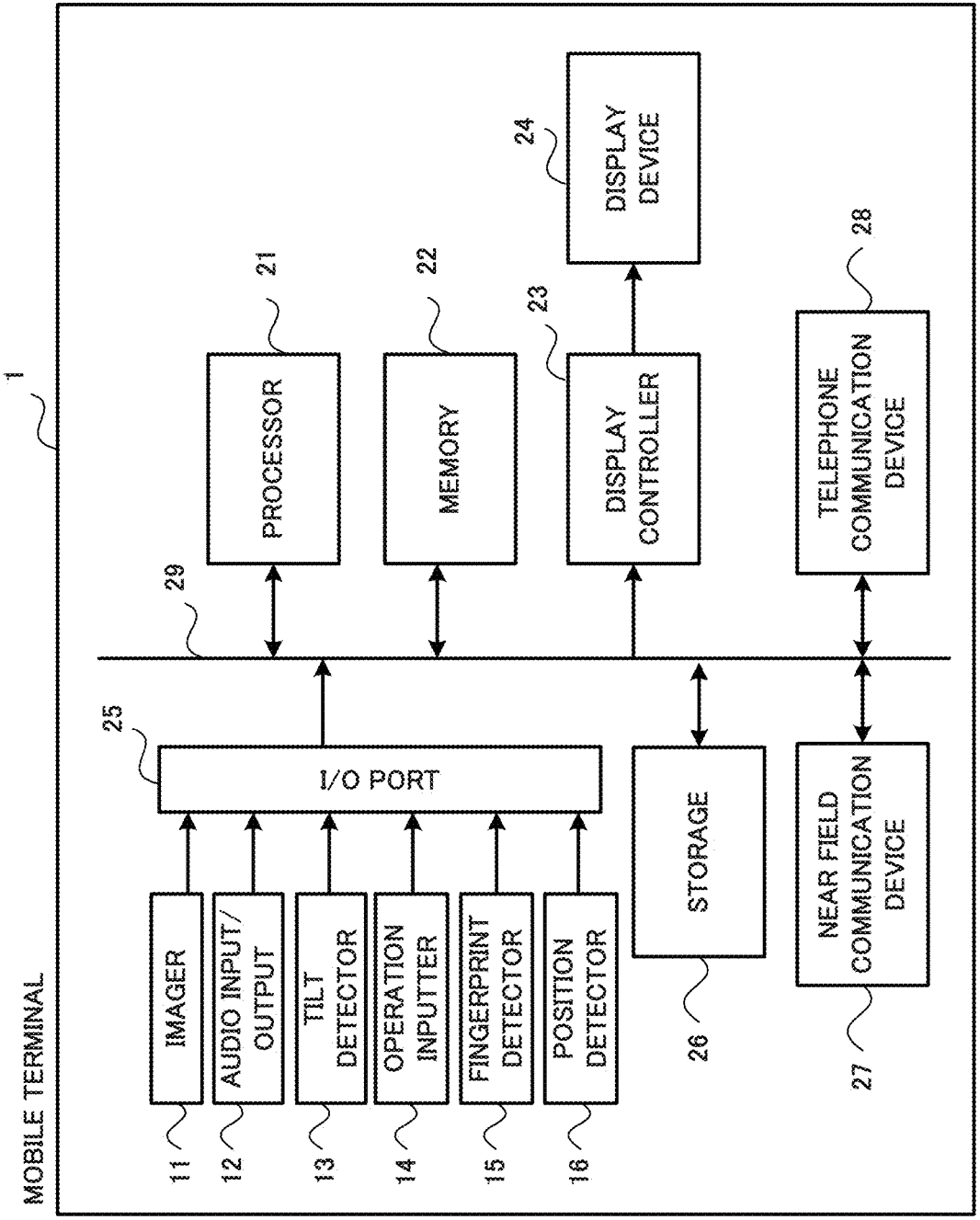

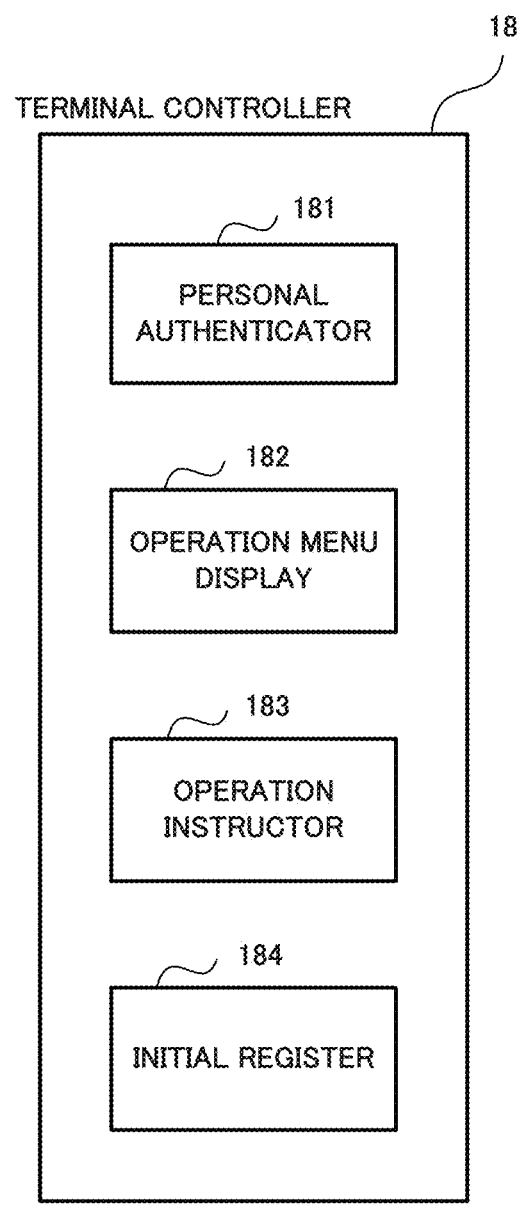

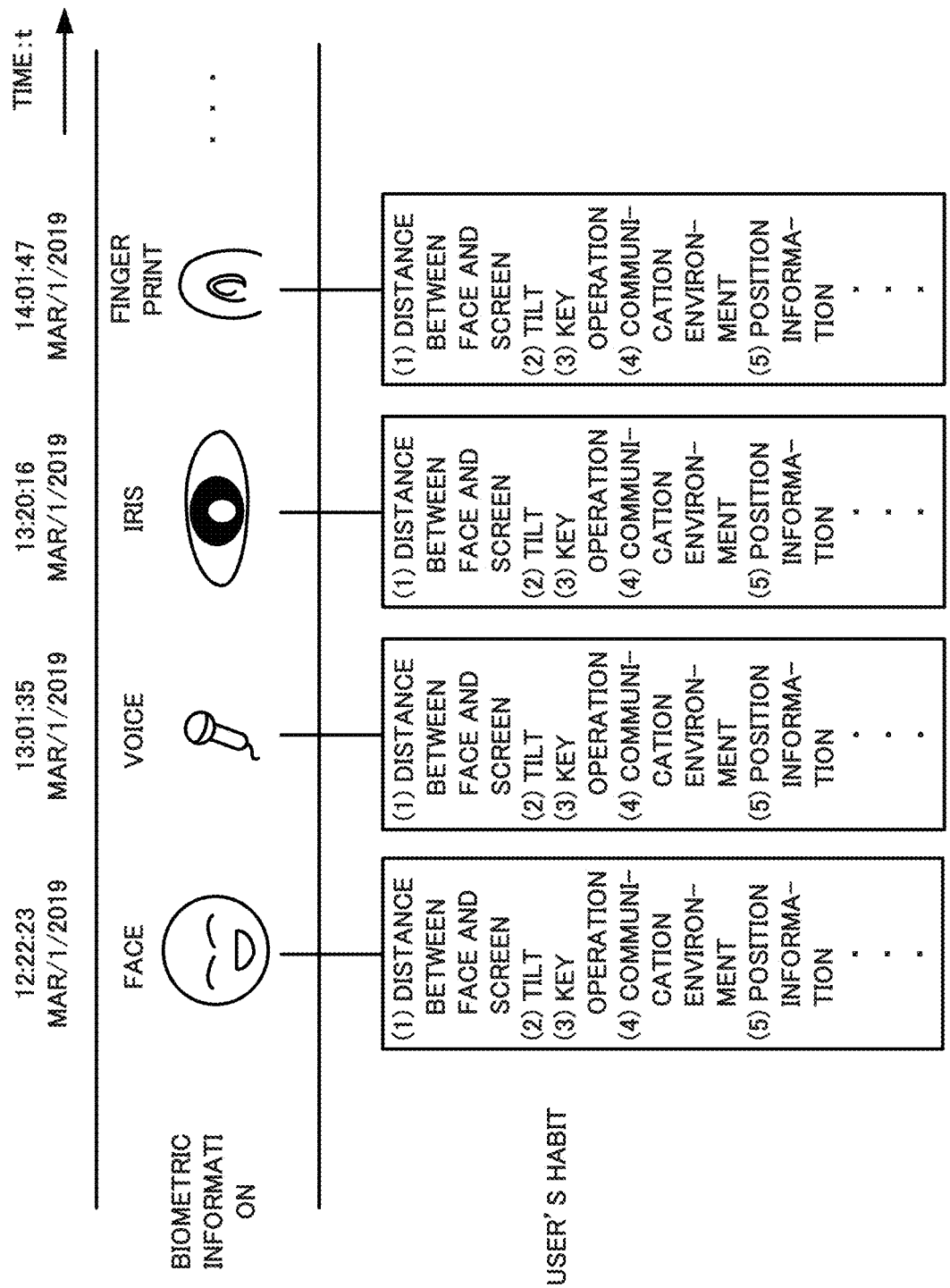

FIG.3B

BIOMETRIC INFORMATION DB FOR AUTHENTICATION 171

| DATE AND TIME | BIOMETRIC INFORMATION | ACQUIRED INFORMATION | SCORE VALUE |
|---|---|---|---|
| 2019/3/1 12:22:23 | FACE | AAA | 100 |
| 2019/3/1 13:01:35 | VOICE | ‖‖‖‖ | -20 |
| 2019/3/1 13:20:16 | IRIS | ●○◎△ | 80 |
| 2019/3/1 14:01:47 | FINGERPRINT | ×○×× | 40 |
| ⋮ | ⋮ | ⋮ | ⋮ |

FIG.3C

USER HABIT DB FOR AUTHENTICATION 172

| DATE AND TIME | USER'S HABIT | ACQUIRED INFORMATION | SCORE VALUE |
|---|---|---|---|
| 2019/3/1 12:22:23 | DISTANCE BETWEEN FACE AND SCREEN | 250mm | 35 |
| 2019/3/1 12:22:23 | TILT | 25 DEGREES | 40 |
| 2019/3/1 12:22:23 | KEY OPERATION | ○○×× | -15 |
| 2019/3/1 12:22:23 | COMMUNICATION ENVIRONMENT | IN-HOUSE LAN | 25 |
| 2019/3/1 12:22:23 | POSITION INFORMATION | ×△°■○'E, ×°■△'N.L. | 42 |
| ⋮ | ⋮ | ⋮ | ⋮ |

FIG.3D

SCORE VALUE TABLE 173

| DATA TYPE | TOTAL VALUE |
|---|---|
| BIOMETRIC INFORMATION | -100~100 |
| USER'S HABIT | -50~50 |
| TOTAL VALUE | 200 |

FIG.5

REMOTE CONTROL TARGET LIST

| DEVICE | OPERATION CONTENT | DEVICE ID |
|---|---|---|
| DOOR DEVICE | LOCK/UNLOCK | D1 |
| WINDOW DEVICE | OPEN/CLOSE | D2 |
| IGNITION DEVICE | ON/OFF | D3 |
| AIR CONDITIONING DEVICE | ON/OFF | D4 |
| AUDIO DEVICE | ON/OFF | D5 |
| ⋮ | ⋮ | ⋮ |

SCORE VALUE TABLE 173A

| DATA TYPE | SCORE VALUE |
|---|---|
| BIOMETRIC INFORMATION | 100 |
| USER'S HABIT | 0 |
| TOTAL VALUE | 100 |

FIG.14

REMOTE CONTROL TARGET LIST

| DEVICE | OPERATION CONTENT | DEVICE ID | MAIN USER | SUB-USER |
|---|---|---|---|---|
| DOOR DEVICE | LOCK/UNLOCK | D1 | OPERATION ENABLED | OPERATION DISABLED |
| WINDOW DEVICE | OPEN/CLOSE | D2 | OPERATION ENABLED | OPERATION DISABLED |
| IGNITION DEVICE | ON/OFF | D3 | OPERATION ENABLED | OPERATION DISABLED |
| AIR CONDITIONING DEVICE | ON/OFF | D4 | OPERATION ENABLED | OPERATION DISABLED |
| AUDIO DEVICE | ON/OFF | D5 | OPERATION ENABLED | OPERATION DISABLED |
| ... | ... | ... | ... | ... |

AUTHORITY INFORMATION

| DEVICE | OPERATION CONTENT | DEVICE ID | OPERATION CONTENT |
|---|---|---|---|
| DOOR DEVICE | LOCK/UNLOCK | D1 | OPERATION DISABLED |
| WINDOW DEVICE | OPEN/CLOSE | D2 | OPERATION DISABLED |
| IGNITION DEVICE | ON/OFF | D3 | OPERATION DISABLED |
| AIR CONDITIONING DEVICE | ON/OFF | D4 | OPERATION ENABLED |
| AUDIO DEVICE | ON/OFF | D5 | OPERATION ENABLED |
| ⋮ | ⋮ | ⋮ | ⋮ |

FIG.21A

BIOMETRIC INFORMATION DB FOR AUTHENTICATION171A

| BIOMETRIC INFORMATION TYPE | REGISTRATION INFORMATION | AVERAGE VALUE OF AUTHENTICATION VALUE | AUTHENTICATION PERMISSIBLE VALUE | AUTHENTICATION THRESHOLD |
|---|---|---|---|---|
| FACE | AAA | 0.44 | 0.48 | 0.40 |
| VOICE | ||||||| | 0.32 | 0.38 | 0.27 |
| IRIS | ●○◎△ | 0.49 | 0.55 | 0.42 |
| FINGERPRINT | ×O×× | 0.39 | 0.41 | 0.30 |
| ... | ... | ... | ... | ... |

FIG.21B

USER HABIT DB FOR AUTHENTICATION 172A

| USER HABIT TYPE | ACQUIRED INFORMATION | LATEST STATE | PASS CONDITION |
|---|---|---|---|
| COMMUNICATION CONNECTION | ABC_WLAN | 31 TIMES | TIMES OF CONNECTION: 100 OR MORE |
| COMMUNICATION CONNECTION | 123WLAN | 157 TIMES | TIMES OF CONNECTION: 100 OR MORE |
| EVENT EXECUTION | O× PARK | 113 M | DISTANCE: WITHIN 100 M |
| EVENT EXECUTION | △●MOVIE THEATER | 72 M | DISTANCE: WITHIN 100 M |
| DISTANCE BETWEEN FACE AND TERMINAL DEVICE | — | 262 MM | DISTANCE: WITHIN PLUS OR MINUS 20 M |
| DEVICE CONNECTION | DEFGH | CONNECTING | CONNECTING |
| ... | ... | ... | ... |

FIG.21C

TILT INFORMATION TABLE 177

| ANGLE | ACQUISITION DATE AND TIME | STANDBY TIME |
|---|---|---|
| 127 DEGREES | JUL/12/2019 11:25:32 | 0.5 SEC |

REMOTE CONTROL DEVICE, INFORMATION PROCESSING METHOD AND RECORDING MEDIUM

TECHNICAL FIELD

The present disclosure relates to a remote control device, an information processing method and a program.

BACKGROUND ART

Remote control devices are used to control various devices such as home appliances and vehicles. With the development of mobile terminals such as smartphones, mobile terminals having a function of a remote control device have been proposed. For example, Patent Literature 1 discloses a mobile phone terminal that can be used as a remote control device for various control target devices.

CITATION LIST

Patent Literature

Patent Literature 1: Unexamined Japanese Patent Application Publication No. 2011-193426

SUMMARY OF INVENTION

Technical Problem

However, in such a type of system, when the remote control device or the mobile terminal itself is stolen, it is difficult to prevent the control target device from being operated, and, in some cases, the control target device may possibly be stolen or destroyed. Although authentication by password, biometric authentication, and/or the like can be set, it is troublesome to conduct authentication processing each time the remote control device is used.

For this reason, a remote control device, an information processing method and/or the like that are highly secure and easy to operate are desired.

The present disclosure has been made in view of such circumstances, and an objective of the present disclosure is to provide a remote control device, an information processing method, and a program that are highly secure and easy to operate.

Solution to Problem

In order to achieve the above objective, the remote control device according to the present disclosure comprises:
  authentication means that automatically acquires biometric information of a user and authenticates the user based on the biometric information and an operation mode of a terminal by the user;
  a receiver that receives an instruction for a control target device from the user; and
  a transmitter that, when the authentication by the authentication means is successful, transmits a signal indicating the instruction received by the receiver to the control target device.

The authentication means, for example, determines a usage mode of a user who operates the remote control device, accumulates information of the usage mode, and authenticates the user based on an operation mode at the time of use and the accumulated usage mode.

For example, the authentication means includes: first authentication means that performs authentication based on first biometric information and an operation mode of the terminal by the user; and second authentication means that performs authentication based on second biometric information that is different from the first biometric information, and the transmitter is configured to be able to transmit a signal indicating an instruction comprising a more limited content when authenticated by the second authentication means than when authenticated by the first transmission means.

For example, the authentication means authenticates a user as a valid user when a sum of an authentication score value based on biometric information acquired from the user and a score value based on a usage mode is equal to or greater than a predetermined total value.

For example, the remote control device may further comprise setting means that sets an authority within which the remote control device can instruct in accordance with an instruction from another remote control device, and the transmitter transmits a signal indicating an instruction to control the same control target device as the other remote control device to the same control target device, based on the authority set by the setting means.

The remote control device may further comprise authority notification means that notifies another remote control device of an authority within which the remote control device can instruct, and the transmitter transmits a signal indicating an instruction to control the same control target device as the other remote control device to the control target device, based on the authority notified by the authority notification means.

In order to achieve the above objective, an information processing method according to the present disclosure includes:
  authenticating a user based on biometric information of the user and an operation mode of a terminal;
  receiving an instruction for a control target device; and
  when the authentication is successful, transmitting the instruction to the external control target device.

In order to achieve the above objective, a program according to the present disclosure causes a computer to perform:
  processing for authenticating a user based on biometric information and an operation mode of a terminal device;
  processing for receiving an instruction for a control target device; and
  processing for transmitting the received instruction to the control target device when the authentication is successful.

Advantageous Effects of Invention

According to the present disclosure, authentication is performed using biometric information and an operation mode (behavior) of a terminal. This makes authentication simple and accurate, facilitating remote control operation.

BRIEF DESCRIPTION OF DRAWINGS

FIG. 2C is a diagram illustrating a hardware configuration of the mobile terminal according to Embodiment 1;

FIG. 2D is an information processing block diagram of a terminal controller according to Embodiment 1;

FIG. 3A is a diagram illustrating an outline of personal authentication data acquired from the terminal according to Embodiment 1;

FIG. 3B is a diagram illustrating a table of biometric information database for authentication acquired from the mobile terminal illustrated in FIG. 2A;

FIG. 3C is a diagram illustrating a table of user habit database for authentication acquired from the mobile terminal illustrated in FIG. 2A;

FIG. 3D is a diagram illustrating a score value table used for user authentication according to the mobile terminal illustrated in FIG. 2A;

FIG. 5 is a diagram illustrating an example of a remote control target list;

FIG. 14 is a diagram illustrating an example of a remote control target list according to Embodiment 3;

FIG. 21A is a diagram illustrating a table of biometric information database for authentication acquired from the mobile terminal illustrated in FIG. 19;

FIG. 21B is a diagram illustrating a table of user habit database for authentication acquired from the mobile terminal illustrated in FIG. 19;

FIG. 21C is a diagram illustrating a tilt information table of the terminal illustrated in FIG. 19;

DESCRIPTION OF EMBODIMENTS

Embodiment 1

Figure 1:
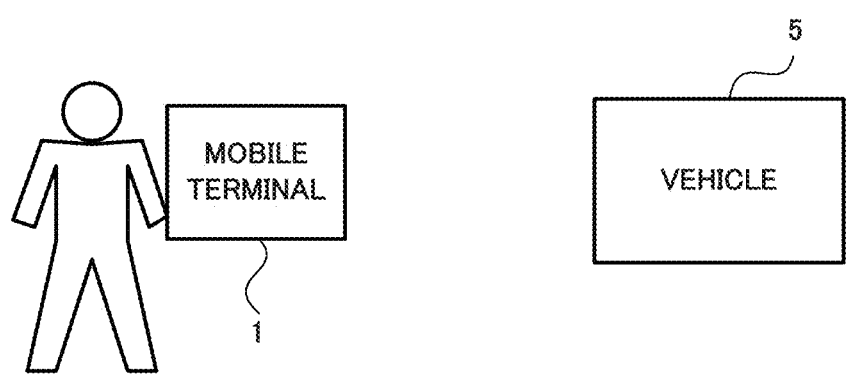
FIG. 1 is a diagram illustrating an overall configuration of an electronic control system according to Embodiment 1 of the present disclosure.

The following will describe a remote control device, an information processing method, and a program according to an embodiment of the present disclosure with reference to the drawings. Note that the same or corresponding parts in the drawings are designated by the same reference numerals.

The remote control device according to Embodiment 1 is configured by a mobile terminal that is an example of a terminal device. In addition to the functions of a general smartphone, the mobile terminal comprises functions of automatically determining whether or not a user has a valid usage authority, receiving an operation instruction to a control target device when it is determined that the user has a valid usage authority, and transmitting a notification of the instruction or the instruction to the control target device.

In order to facilitate understanding, the following description will be made in conditions where the control target device is a vehicle 5 and the types of operations are door lock and unlock with a door device 53, turning on/off of an air conditioner with an air conditioning device 56, and turning on/off of an audio device 57.

The configuration of the electronic control system 100 according to Embodiment 1 is illustrated in FIG. 1. The electronic control system 100 includes a mobile terminal 1 that is held by a user and used as a remote control device, and the vehicle 5 to be controlled. Note that the mobile terminal 1 is an example of an information processing device within the scope of the claims.

The mobile terminal 1 is a so-called smartphone, and has an authentication function that uses biometric information such as a user's face image, fingerprint, and voiceprint, as well as, user's habit information based on a user's specific behavior, an operation state, and the like when operating the mobile terminal 1.

Figure 2A:
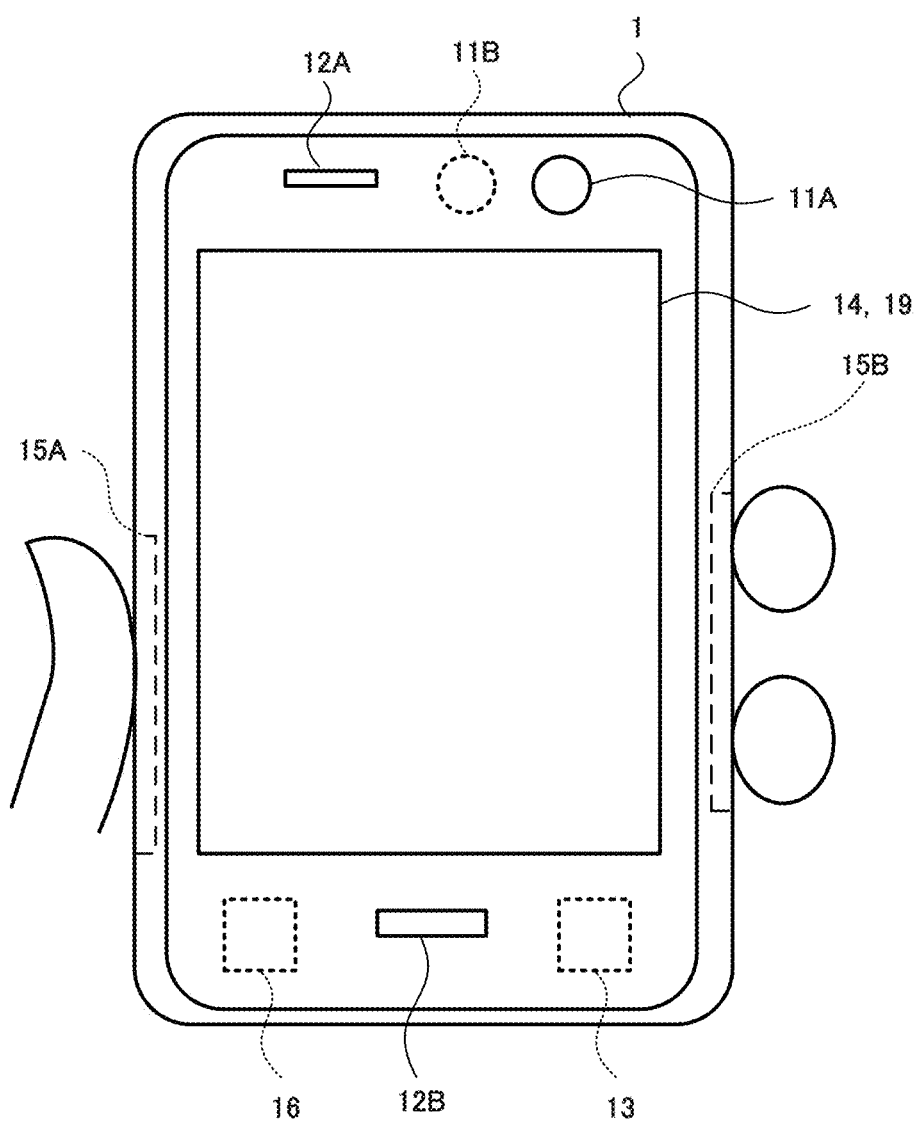
FIG. 2A is a front view of a mobile terminal according to Embodiment 1.

As illustrated in FIG. 2A, the mobile terminal 1 comprises, on the front surface of the mobile terminal 1, an in-camera 11A for photographing a user's face, a speaker 12A, a call microphone (microphone) 12B, and a touch panel that serves as an operation inputter 14 as well as a display 19. The mobile terminal 1 further comprises, on the sides of the mobile terminal 1, a left fingerprint sensor 15A and a right fingerprint sensor 15B for detecting a user's fingerprint. The mobile terminal 1 internally comprises a tilt detector 13 for detecting the tilt of the mobile terminal 1 and a position detector 16 for detecting the current position of the mobile terminal 1. Further, the mobile terminal 1 comprises, on the back surface, a main camera 11B capable of photographing a person, a landscape, an object, and the like as seen by the user.

Hereinafter, the in-camera 11A and the main camera 11B are collectively referred to as the imager 11. The speaker 12A and the call microphone 12B are collectively referred to as the audio input/output 12. Further, the left fingerprint sensor 15A and the right fingerprint sensor 15B are collectively referred to as the fingerprint detector 15.

Figure 2B:
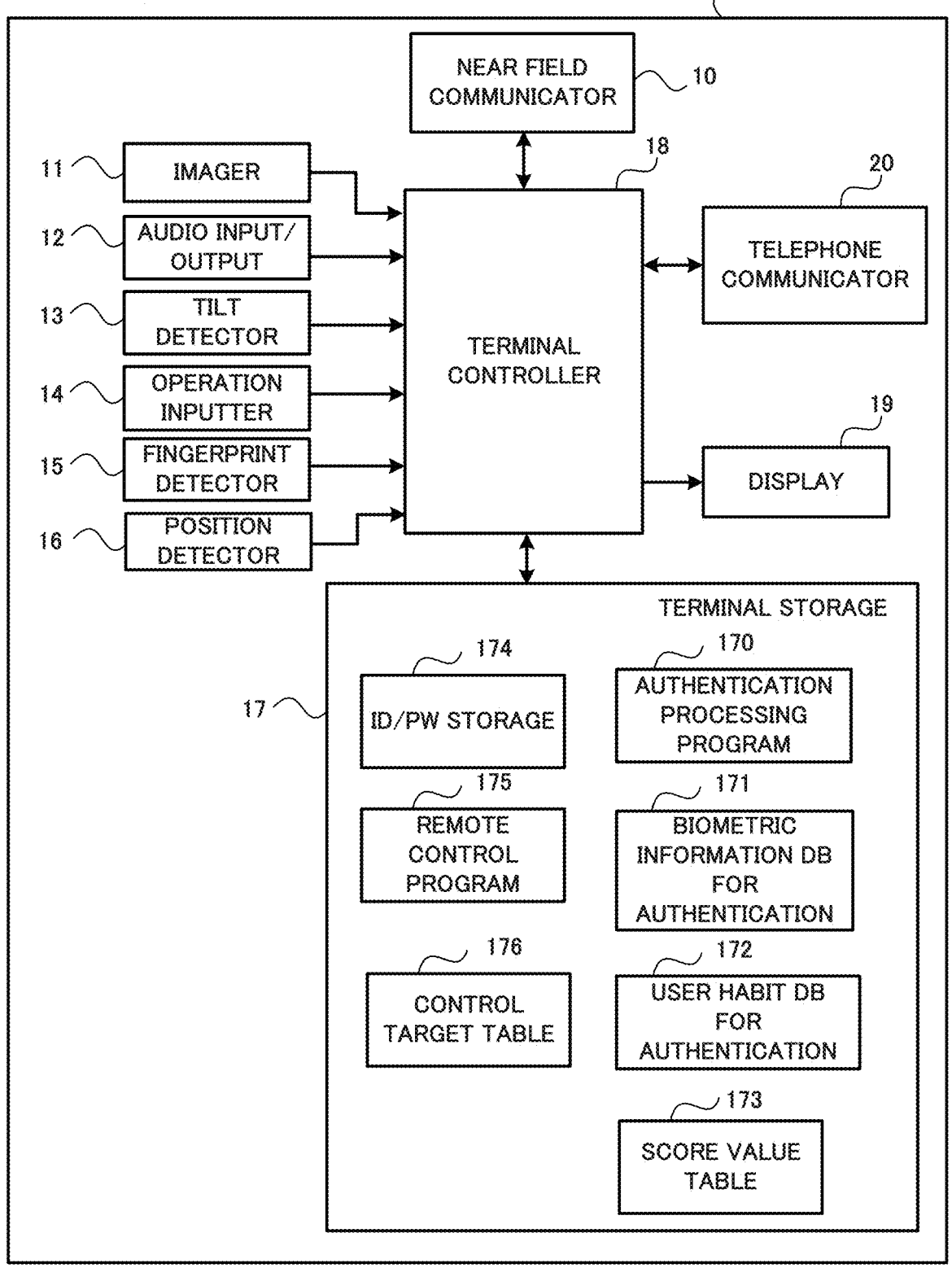
FIG. 2B is a configuration diagram of the mobile terminal according to Embodiment 1.

FIG. 2B is a block diagram illustrating the configuration of the mobile terminal 1. The mobile terminal 1 comprises a near field communicator 10, an imager 11, an audio input/output 12, a tilt detector 13, an operation inputter 14, a fingerprint detector 15, a position detector 16, a terminal storage 17, a terminal controller 18, a display 19, and a telephone communicator 20.

The near field communicator 10 is configured by a short-range wireless communication device using, such as, Bluetooth (registered trademark), Wi-Fi, and infrared communication, and wirelessly communicates with the control device of the control target vehicle 5 to transmit and receive signals. The imager 11 includes the in-camera 11A and the main camera 11B illustrated in FIG. 2A. As for the imager 11, various cameras can be used that can acquire a still image or a moving image, such as a camera and a video camera, using an image sensor, such as a charge coupled device (CCD) and a complementary metal oxide semiconductor (CMOS).

The audio input/output 12 includes the speaker 12A illustrated in FIG. 2A and the call microphone 12B. The speaker 12A outputs a voice or the like received through a voice call. The call microphone 12B is a device that picks up a voice of a user.

The tilt detector 13 is a sensor that detects tilt, shaking, etc. of the mobile terminal 1. The tilt detector 13 can be configured by using various sensors, such as an acceleration sensor and an angle sensor, that can detect the tilt of the mobile terminal 1. Note that the number of sensors, such as an acceleration sensor and an angle sensor, and may be singular or plural. Further, the sensor may be a single type or a combination of a plurality of types.

The operation inputter 14 is a device capable of inputting an operation by a user. The fingerprint detector 15 is a sensor that detects a user's fingerprint. The fingerprint detector 15 includes the left fingerprint sensor 15A and the right fingerprint sensor 15B illustrated in FIG. 2A.

The position detector 16 is a device capable of detecting the current position of the mobile terminal 1. The position detector 16 can be configured by using a device such as a global positioning system (GPS) that can detect the current position of the mobile terminal 1.

The terminal storage 17 includes an authentication processing program 170, a biometric information database for authentication 171, a user habit database for authentication 172, a score value table 173, an ID/PW storage 174, a remote control program 175, and a control target table 176.

The authentication processing program 170 is a program that performs processing for authenticating a user.

The biometric information database for authentication 171 is a database that stores information on biometric information of a user and authentication results. The user habit database for authentication 172 is a database that stores information on user-specific habits when operating the mobile terminal 1 and authentication results. Here, the user-specific habit refers to a behavior peculiar to a user when operating the mobile terminal 1, such as actions when the user operates the mobile terminal 1, a distance between the screen of the display 19 and the user's face, a keystroke, the way of holding the mobile terminal 1, a place where the mobile terminal 1 is used, and a communication environment.

The score value table 173 is a table that records score values, as will be described later, for authentication processing.

The ID/PW storage 174 stores terminal identification information (Identifier: ID) and passwords that are set in advance in the mobile terminal 1.

The remote control program 175 is a program that displays an operation screen and transmits an operation signal to a control target device in response to an operation on the operation screen by the user. The details of the program will be described later. The control target table 176 is a table that stores control target devices and the control contents of the control target devices.

The terminal controller 18 executes various programs stored in the terminal storage 17. The terminal controller 18 also acquires and processes various data from the near field communicator 10, the imager 11, the audio input/output 12, the tilt detector 13, the operation inputter 14, the fingerprint detector 15, the position detector 16 and the telephone communicator 20 and stores the data in the terminal storage 17.

The display 19 displays the processing contents of various programs executed by the terminal controller 18. The display 19 can also display an image, such as a still image and a moving image captured by the imager 11, data that is input from the operation inputter 14, and/or the like. The display 19 is laminated on the operation inputter 14 and constitutes the touch panel illustrated in FIG. 2A.

The telephone communicator 20 transmits and receives a radio signal for telephone communication to and from a base station under the control of the terminal controller 18.

Next, an example of the hardware configuration of the mobile terminal 1 will be described with reference to FIG. 2C. The mobile terminal 1 comprises a processor 21 that executes various programs, a memory 22 for deploying various programs, a display controller 23 that outputs various display data, a display device 24 that displays various display data, I/O ports 25 for connecting the imager 11, the audio input/output 12, and/or the like, a storage 26 that stores various programs and various data, a near field communication device 27 that transmits and receives communication data to and from the vehicle 5, and a telephone communication device 28. The processor 21, the memory 22, the display controller 23, the I/O ports 25, the storage 26, the near field communication device 27, and the telephone communication device 28 are connected to one another via a data bus 29.

The processor 21 reads out various programs stored in the storage 26, loads the programs on the memory 22, and executes the programs. The processor 21 is configured by a processing device such as a central processing unit (CPU) and a micro-processing unit (MPU). The memory 22 is configured by a storage element and a storage medium such as a volatile or non-volatile semiconductor memory, for example, a random access memory (RAM) and a flash memory.

The display controller 23 is a controller that outputs various display data to the display device 24. The display controller 23 is configured by a video signal output device, such as a video card, a graphics processing unit (GPU), and a graphic board. The display device 24 is configured by a display device, such as a liquid crystal display (LCD) monitor and an organic electroluminescence (EL) monitor.

The I/O port 25 is a connection port that can connect the imager 11, the audio input/output 12, the tilt detector 13, the operation inputter 14, the fingerprint detector 15, and the position detector 16. The I/O port 25 is configured by various ports to which devices and sensors can be connected, such as a universal serial bus (USB) port and an IEEE1394 port.

The storage 26 is a device that stores various programs executed by the processor 21 and various data used in the various programs. The storage 26 is configured by a non-volatile storage device, such as a hard disk drive (HDD) and a solid state drive (SSD).

The near field communication device 27 can perform short-range wireless communication with the vehicle 5. The near field communication device 27 is configured by any one of various devices that perform relatively short-range communication by wireless communication, such as a wireless local area network (LAN) and Bluetooth (registered trademark). The near field communication device 27 constitutes the near field communicator 10. The telephone communication device 28 comprises a communication device that performs telephone communication with a base station (not illustrated). The telephonic communication device 28 constitutes the telephone communicator 20.

When the processor 21 executes the authentication processing program 170 stored in the terminal storage 17, a personal authenticator 181 is realized in the terminal controller 18 as illustrated in FIG. 2D. As such, personal authentication of a user is carried out. When the processor 21 executes a remote control program 175 stored in the terminal storage 17, an operation menu display 182 that displays an operation menu, an operation instructor 183 that transmits an operation signal corresponding to an operation made to the operation menu, and an initial register 184 are realized in the terminal controller 18, as illustrated in FIG. 2D. In this way, the mobile terminal 1 can function as a remote control device for the vehicle 5.

The personal authenticator 181 performs biometric authentication using biometric information of a user, as well as, habit authentication that gives a higher point when the current operation mode of the mobile terminal 1 matches the user's operation habit, based on the history information of the operation mode of the mobile terminal 1.

Figure 6:
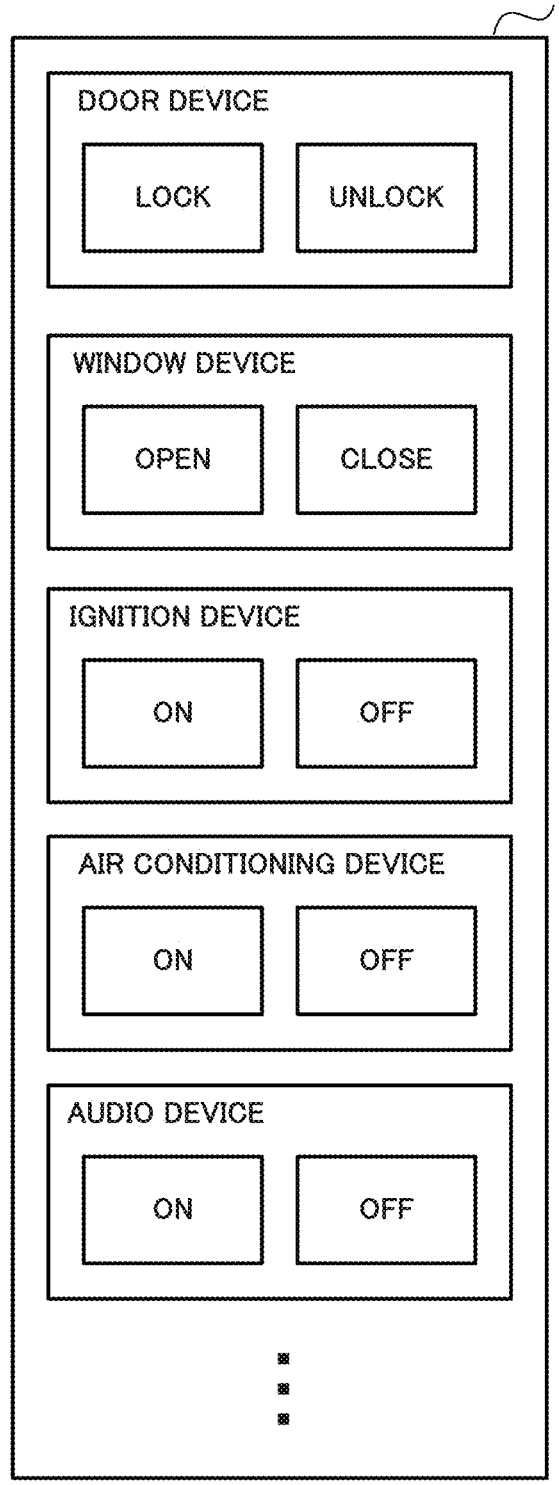
FIG. 6 is a diagram illustrating an example of an operation screen.

The operation menu display 182 displays an operation menu including buttons indicating operation targets and operation contents on the display 19 as illustrated in FIG. 6.

The operation instructor 183, in response to a touch operation by a user made to a button on the displayed operation menu, transmits an instruction corresponding to the touched button to the vehicle 5 via the near field communicator 10.

The initial register 184 registers the information of the vehicle 5 and performs processing for enabling the mobile terminal 1 to be used as a remote control device.

Figure 2E:
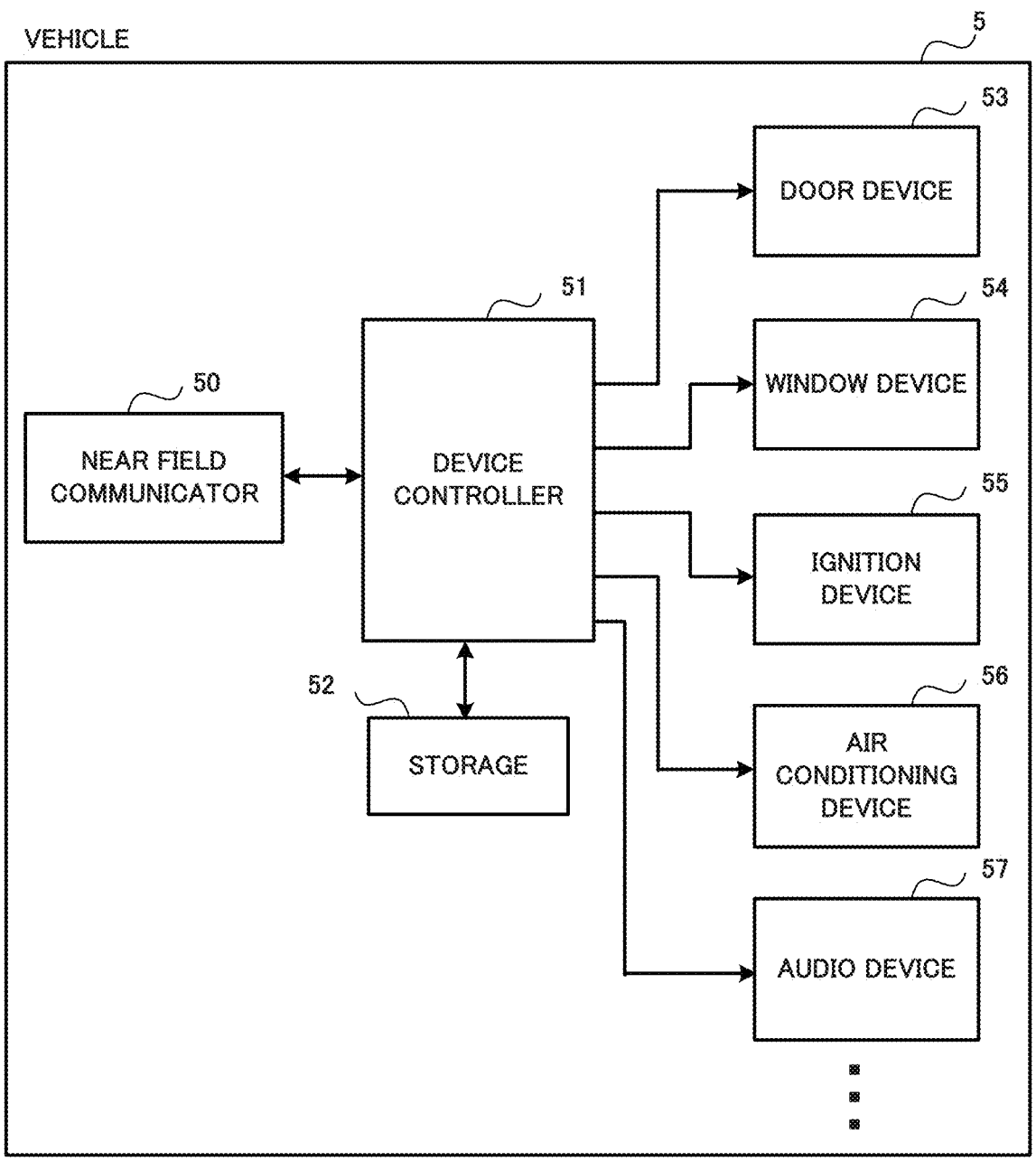
FIG. 2E is a block diagram illustrating a configuration of a control target device according to Embodiment 1.

Whereas, the vehicle 5 has the configuration illustrated in FIG. 2E. As illustrated in FIG. 2E, the vehicle 5 is a device to be remotely controlled by a remote control device configured by the mobile terminal 1. The vehicle 5 comprises a near field communicator 50, a device controller 51, a storage 52, a door device 53, a window device 54, an ignition device 55, an air conditioning device 56, an audio device 57, and the like.

The near field communicator 50 performs short-range wireless communication with the near field communicator 10 of the mobile terminal 1.

The device controller 51 receives an operation instruction from the mobile terminal 1 via the near field communicator 50, and, according to the instruction, controls the door device 53, the window device 54, the ignition device 55, the air conditioning device 56, the audio device 57 and the like. The device controller 51 is configured by a processor such as a CPU.

The storage 52 stores an operation program for causing the device controller 51 to execute a control operation.

Further, the storage 52 stores a remote control target list subject to a remote control operation. As illustrated in FIG. 5, the remote control target list includes a device subject to a remote control operation, the content of the operation, and the identification number of the device. For example, as illustrated in FIG. 5, the door device 53 is subject to a remote control operation. The content of the operation is locking/unlocking the door. The device ID of the door device 53 is D1. The storage 52 also stores authentication information for authenticating remote control of the device.

Next, the user authentication method of the mobile terminal 1 executed by the identity authenticator 181 will be described with reference to FIGS. 3A to 3D.

As a premise, the biometric information database for authentication 171 is assumed to register biometric information such as a fingerprint, the face, the iris patterns, and the like of a user that have been registered in advance by an operation of the user.

The terminal controller 18 of the mobile terminal 1 illustrated in FIG. 2B acquires biometric information when there is an operation of the mobile terminal 1 caused by a user, such as fingerprint detection by the fingerprint detector 15, or when requested from another program. The biometric information data acquired by the terminal controller 18 includes an image of the user's face photographed with the in-camera 11A illustrated in FIG. 2A, the user's voice picked up with the call microphone 12B, an image of the user's iris photographed with the in-camera 11A, a fingerprint detected by the fingerprint detector 15, and/or the like.

For example, when a user brings the mobile terminal 1 to a position where the front surface of the display 19 illustrated in FIG. 2A faces the face of the user, the terminal controller 18 photographs an image of the user's face with the in-camera 11A illustrated in FIG. 2A and acquires the image as biometric information of the user. Further, when the user calls other person with the mobile terminal 1, the terminal controller 18 acquires the voice of the user picked up by the call microphone 12B as biometric information of the user. When the user holds the mobile terminal 1 and brings the face closer to the front surface of the display 19 illustrated in FIG. 2A than a certain distance, the terminal controller 18 acquires an image of the user's iris photographed with the in-camera 11A as biometric information of the user. When the user has held the mobile terminal 1 for a predetermined amount of time or more, the terminal controller 18 acquires a fingerprint detected by the fingerprint detector 15 as biometric information of the user.

For example, a user is assumed to bring the mobile terminal 1 to a position where the front surface of the display 19 illustrated in FIG. 2A faces the user's face at 12:22:23 on Mar. 1, 2019 illustrated in FIG. 3A. The terminal controller 18 photographs an image of the user's face with the in-camera 11A and stores the image in the mobile terminal 1 as biometric information of the user. The terminal controller 18 compares the feature amount of the user's face image registered in advance in the mobile terminal 1 with the feature amount of the user's face image acquired from the in-camera 11A, and obtains similarity.

A score value is calculated from this similarity. The score value is set to an upper limit value when the feature amount of the data registered in advance and the feature amount of the data acquired by the terminal controller 18 match, and to a lower limit value when they do not match. In between the match and mismatch, the score value is set to a value according to the similarity of the feature amount.

The upper limit value and the lower limit value of the score value are stored in the score value table 173 stored in the terminal storage 17 of the mobile terminal 1 illustrated in FIG. 2B. The score values set in the score value table 173 are illustrated in FIG. 3D. In the score value table 173, the upper limit value and the lower limit value of the score value of biometric information are set as −100 and 100. Further, the upper limit value and the lower limit value of the score value of user habit data are set as −50 and 50.

Here, it is assumed that the feature amounts match and the upper limit value 100 of the ecological information set in the score value table 173 illustrated in FIG. 3D is set as the score value. The terminal controller 18 writes the acquired biometric information data and the obtained score value into the biometric information database for authentication 171 illustrated in FIG. 2B. The table of the biometric information database for authentication 171 is illustrated in FIG. 3B. The table of the biometric information database for authentication 171 includes items of date and time when the terminal controller 18 acquired biometric information, the type of the acquired biometric information, the acquired information, and the score value.

The terminal controller 18 writes 12:22:23 on Mar. 1, 2019, which is the date and time when the biometric information was acquired, in an item of the date and time in the table of the biometric information database for authentication 171 illustrated in FIG. 3B. The terminal controller 18 writes "face" in an item of the acquired biometric information type. The terminal controller 18 writes the data of the user's face image acquired from the in-camera 11A in an item of the acquired information. The terminal controller 18 writes "100" in an item of the score value.

Next, the terminal controller 18 acquires user habit data. This user habit refers to a user-specific behavior, such as a behavior, an operation state, a location, and a communication state, when the user uses the mobile terminal 1. The user habit data acquired by the terminal controller 18 is data at the same date and time as when the biometric information was acquired. For example, at 12:22:23 on Mar. 1, 2019 illustrated in FIG. 3A, the terminal controller 18 acquires, as user habit data, a distance between the user's face and the screen of the display 19 calculated from the image of the user's face photographed with the in-camera 11A illustrated in FIG. 2A, a tilt angle of the mobile terminal 1 calculated with the tilt detector 13, data of a key operation stroke obtained with the operation inputter 14, information on the communication environment acquired from the near field communicator 10, the position information of the mobile terminal 1 acquired from the position detector 16, and/or the like.

The terminal controller 18 compares the feature amount of each user habit data registered in advance in the mobile terminal 1 with the feature amount of each data related to the acquired user's habit, and obtains similarity. The terminal controller 18 calculates a score value for each user habit data, based on the obtained similarity. This score value is a value within the range from the upper limit value 50 to the lower limit value −50 that are set in the score value table 173 illustrated in FIG. 3D.

The terminal controller 18 writes the acquired user habit data and the calculated score value into the user habit database for authentication 172 stored in the terminal storage 17 of FIG. 2B. The table of the user habit database for authentication 172 is illustrated in FIG. 3C. The table of the user habit database for authentication 172 includes items of the date and time when the terminal controller 18 acquired a user habit data, the type of the user's habit, the acquired data, and the score value.

For example, the terminal controller 18 writes 12:22:23 on Mar. 1, 2019, which is the same date and time when the biometric information was acquired, in an item of the date and time of the table of the user habit database for authentication 172 illustrated in FIG. 3C. The terminal controller 18 writes the "distance between the face and the screen" in an item of the user's habit. The terminal controller 18 writes "250 mm" in an item of the acquired information. This "250 mm" is the distance between the user's face and the screen calculated by the terminal controller 18 based on the image of the user's face photographed with the in-camera 11A.

The terminal controller 18 compares the calculated distance value between the user's face and the screen with the distance value between the user's face and the screen registered in the mobile terminal 1, and calculates a score value from the similarity. Here, the calculated score value is assumed to be 35 as the distances do not match but the similarity is high. The terminal controller 18 writes "35" in an item of the score value of the table illustrated in FIG. 3C.

Subsequently, the terminal controller 18 writes data related to the obtained user's habit, such as the tilt angle of the mobile terminal 1 obtained by the tilt detector 13, in each item of the table of the user habit database for authentication 172 illustrated in FIG. 3C. After writing data relating to all the user habits, the terminal controller 18 calculates the sum of the score values of the same date and time in the biometric information database for authentication 171 illustrated in FIG. 3B and the user habit database for authentication 172 illustrated in FIG. 3C.

For example, the score value of biometric information is "100" at the date and time of 12:22:23 on Mar. 1, 2019 in the biometric information database for authentication 171 illustrated in FIG. 3B. At the same date and time, the score values of user's habits in the user habit database for authentication 172 illustrated in FIG. 3C are "35," "40," "−15," "25," and "42" in order from the top. The sum of the score value "100" of the biometric information and the score values "35," "40," "−15," "25," and "42" of the user's habits is 227.

The terminal controller 18 acquires the score value that is set in the item of the total value from the score value table 173 illustrated in FIG. 3D. The terminal controller 18 compares the sum of the score values of the biometric information and the user's habits with the score value set in the item of the total value from the score value table 173. If the sum of the score values of the biometric information and the user's habits is equal to or greater than the score value set in the item of the total value of the score value table 173, the terminal controller 18 authenticates the user using the mobile terminal 1 as a valid user, and if the sum is less than or equal to the total score value, the terminal controller 18 does not authenticate the user as not being a valid user.

For example, in the score value table 173 illustrated in FIG. 3D, "200" is set as the total value of the score value. The terminal controller 18 compares the sum of the obtained score values "227" with the total value of the score value "200" set in the score value table 173. Since the sum of the obtained score values is greater than the total value of the score value set in the score value table 173, the terminal controller 18 authenticates the user operating the mobile terminal 1 as a valid user.

The user authentication method of the mobile terminal 1 executed by the personal authenticator 181 is stored in the terminal storage 17 as an authentication processing program 170. The personal authenticator 181 of the terminal controller 18 executes the authentication processing program 170 to authenticate a user when there is an operation of the mobile terminal 1 caused by the user, such as fingerprint detection with the fingerprint detector 15, or when there is a request from another program.

Authentication processing executed by the authentication processing program 170 will be described below with reference to the authentication processing flowchart illustrated in FIG. 4. When the authentication processing program 170 is activated, the personal authenticator 181 of the terminal controller 18 acquires biometric information, such as a face image and a fingerprint of a user (Step S1). Next, the personal authenticator 181 of the terminal controller 18 acquires data related to a user's habit (Step S2).

The personal authenticator 181 of the terminal controller 18 compares the feature amount of the biometric information registered in advance in the mobile terminal 1 with the feature amount of the acquired biometric information, and calculates similarity. The personal authenticator 181 of the terminal controller 18 calculates a score value within the range from the upper limit value to the lower limit value of the score value of the biometric information set in the score value table 173 of FIG. 3D, based on the calculated similarity. Further, the personal authenticator 181 of the terminal controller 18 compares the feature amount of the user habit data registered in advance in the mobile terminal 1 with the feature amount of the acquired user habit data, and calculates similarity. The personal authenticator 181 of the terminal controller 18 calculates a score value within the range from the upper limit value to the lower limit value of the score value of the user's habit set in the score value table 173 of FIG. 3D, based on the calculated similarity (Step S3).

The personal authenticator 181 of the terminal controller 18 writes the acquired biometric information data and the calculated score value into the biometric information database for authentication 171 illustrated in FIG. 2B. The personal authenticator 181 of the terminal controller 18 also writes the acquired user habit data and the calculated score value into the user habit database for authentication 172 stored in the terminal storage 17 of FIG. 2B (Step S4).

The personal authenticator 181 of the terminal controller 18 sums the score values of the biometric information and the user habit data at the same date and time (Step S5). The personal authenticator 181 of the terminal controller 18 acquires the score value set in the item of the total value from the score value table 173 illustrated in FIG. 3D. The personal authenticator 181 of the terminal controller 18 compares the sum of the score values of the biometric information and the user's habit with the score value set in the item of the total value from the score value table 173 (Step S6).

If the sum of the score values of the biometric information and the user's habit is equal to or greater than the score value set in the item of the total value (threshold value) from the score value table 173 (Step S6; YES), the personal authenticator 181 of the terminal controller 18 authenticates the user using the mobile terminal 1 as a valid user (Step S7).

Next, the personal authenticator 181 of the terminal controller 18 calculates an average value of the feature amount of the biometric information registered in advance in the mobile terminal 1 and the feature amount of the acquired biometric information. The personal authenticator 181 of the terminal controller 18 updates the feature amount of the biometric information registered in the mobile terminal 1 with the calculated average value. The personal authenticator 181 of the terminal controller 18 also calculates an average value of the feature amount of the user habit data registered in advance in the mobile terminal 1 and the feature amount of the acquired user habit data. The personal authenticator 181 of the terminal controller 18 updates the feature amount of the user habit data registered in the mobile terminal 1 with the calculated average value (Step S8).

If the sum of the score values of the biometric information and the user's habit is equal to or less than the score value set in the item of the total value (threshold value) from the score value table 173 (Step S6; NO), the personal authenticator 181 of the terminal controller 18 causes the display 19 illustrated in FIG. 2B to display a message indicating that the user is a different person (Step S9). The personal authenticator 181 of the terminal controller 18 sets the mobile terminal 1 in a state in which the operation of the mobile terminal 1 is difficult, and then returns to Step S1. The state in which the operation of the mobile terminal 1 is difficult is, for example, a state in which the screen of the display 19 illustrated in FIG. 2A is grayed out so that input from the operation inputter 14 is not accepted. Note that the authentication processing program 170 is an example of user authentication means within the scope of the claims.

Performing the above-mentioned user authentication method in this way, makes it possible to determine whether or not the user who uses the mobile terminal 1 is an authentic user. In Embodiment 1, by performing the above-mentioned user authentication method, when the user who uses the mobile terminal 1 is authenticated as an authentic user, the user can use the mobile terminal 1 as a remote control device of the control target device, and when the user who uses the mobile terminal 1 is not authenticated as an authentic user, the user cannot use the mobile terminal 1 as a remote control device.

Figure 7:
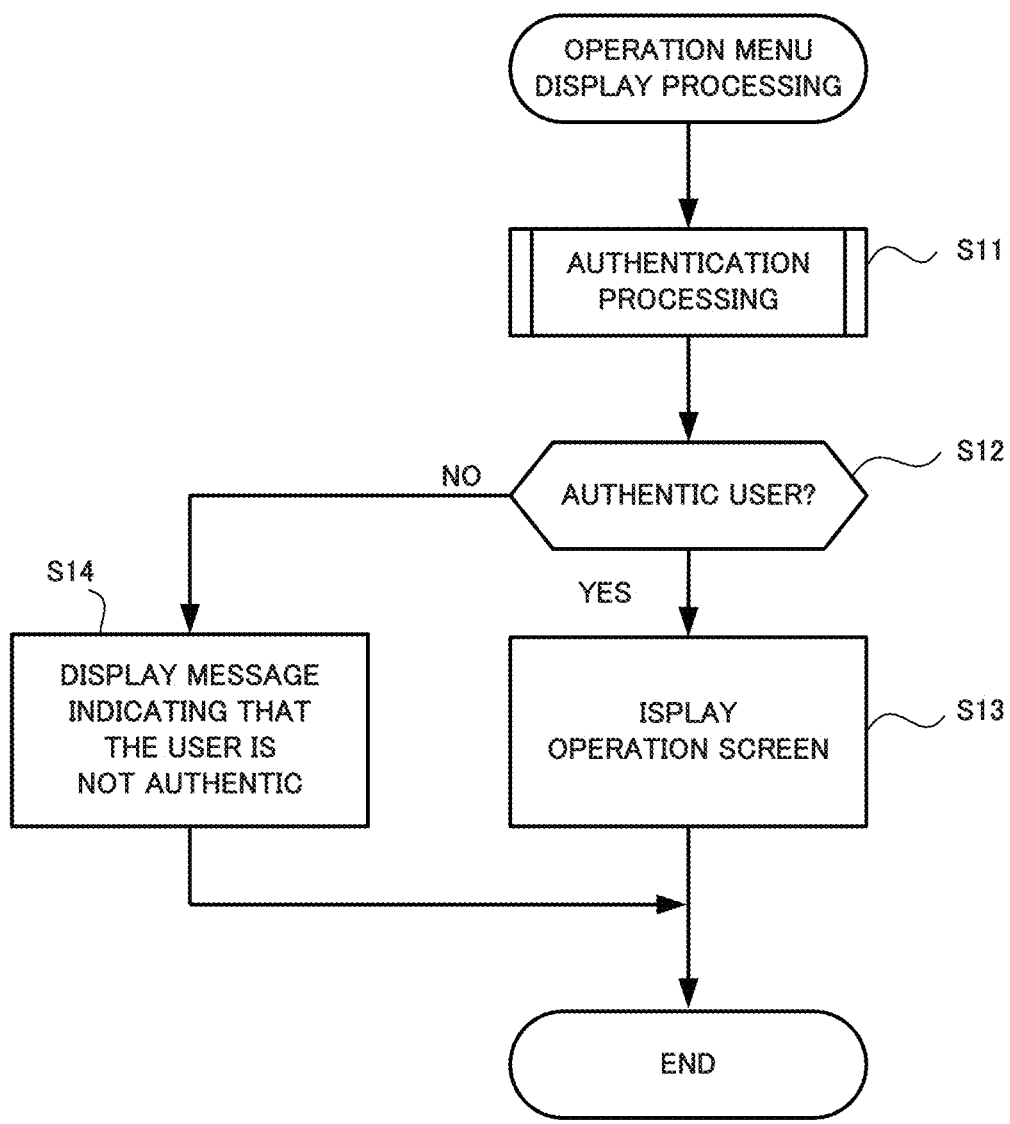
FIG. 7 is a flowchart of operation menu display processing.

To use the mobile terminal 1 as a remote control, the user operates (touches) the "remote control" icon included in the initial screen displayed on the display 24. In response to the operation of the "remote control" icon, the operation menu display 182 of the terminal controller 18 starts the operation menu display processing illustrated in FIG. 7. When the operation menu display processing is started, the operation menu display 182 of the terminal controller 18 first executes the authentication processing (Step S11) described with reference to FIG. 4.

Figure 4:
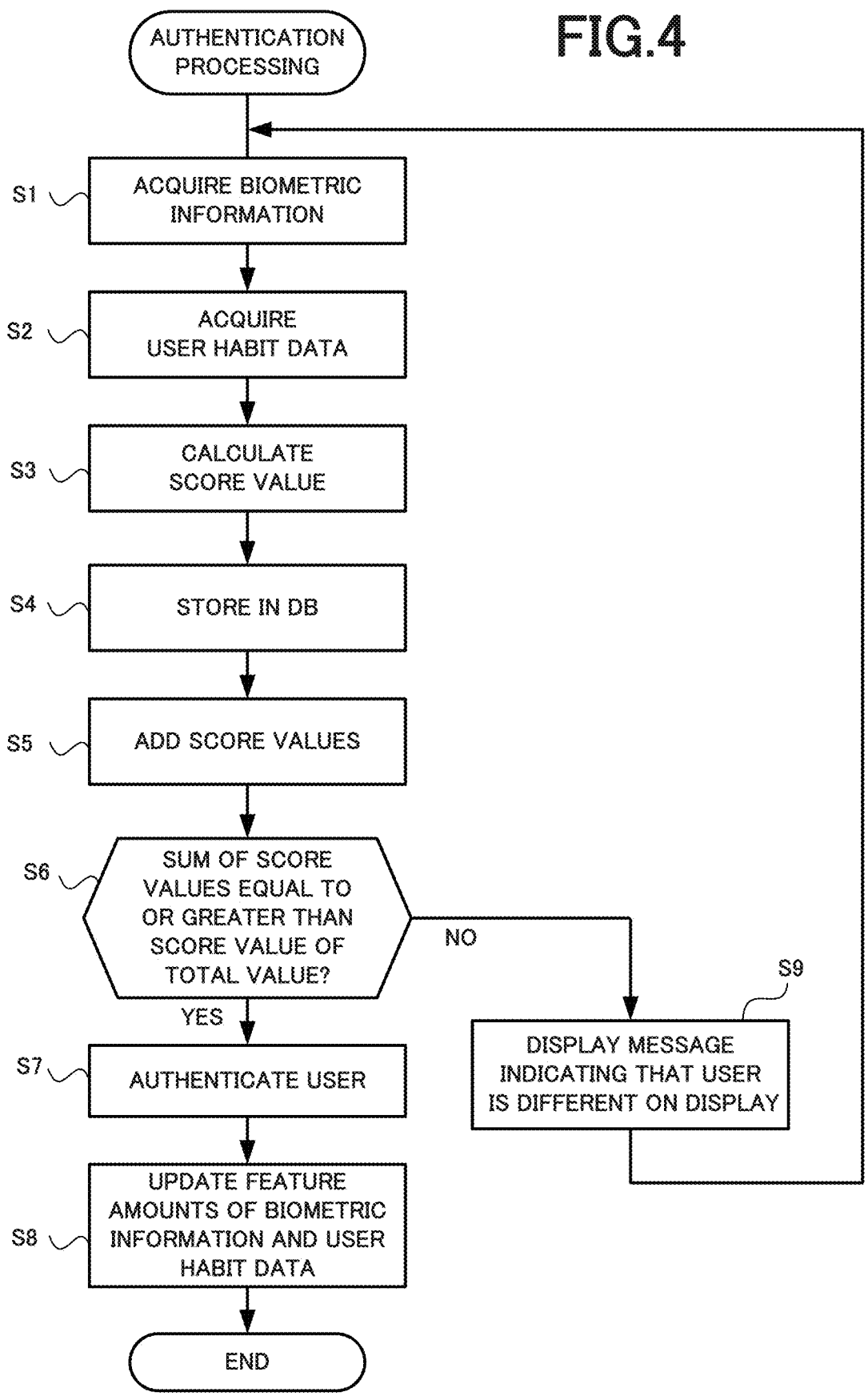
FIG. 4 is a flowchart of authentication processing for authenticating a user with the mobile terminal illustrated in FIG. 2A.

In the authentication processing illustrated in FIG. 4, if the user is authenticated as an authentic user (Step S12: Yes), the operation menu display 182 of the terminal controller 18 synthesizes and displays the operation menu illustrated in FIG. 6 on the display 19 according to the remote control target list illustrated in FIG. 5 stored in the control target table 176 (Step S13). On the other hand, if the authentication is not successful (Step S12: No), the operation menu display 182 of the terminal controller 18 does not display the operation menu illustrated in FIG. 6 and displays a message indicating that the user is not a valid user (Step S14). The operation menu display 182 of the terminal controller 18 sets the operation in a difficult state and ends the processing.

Figure 8:
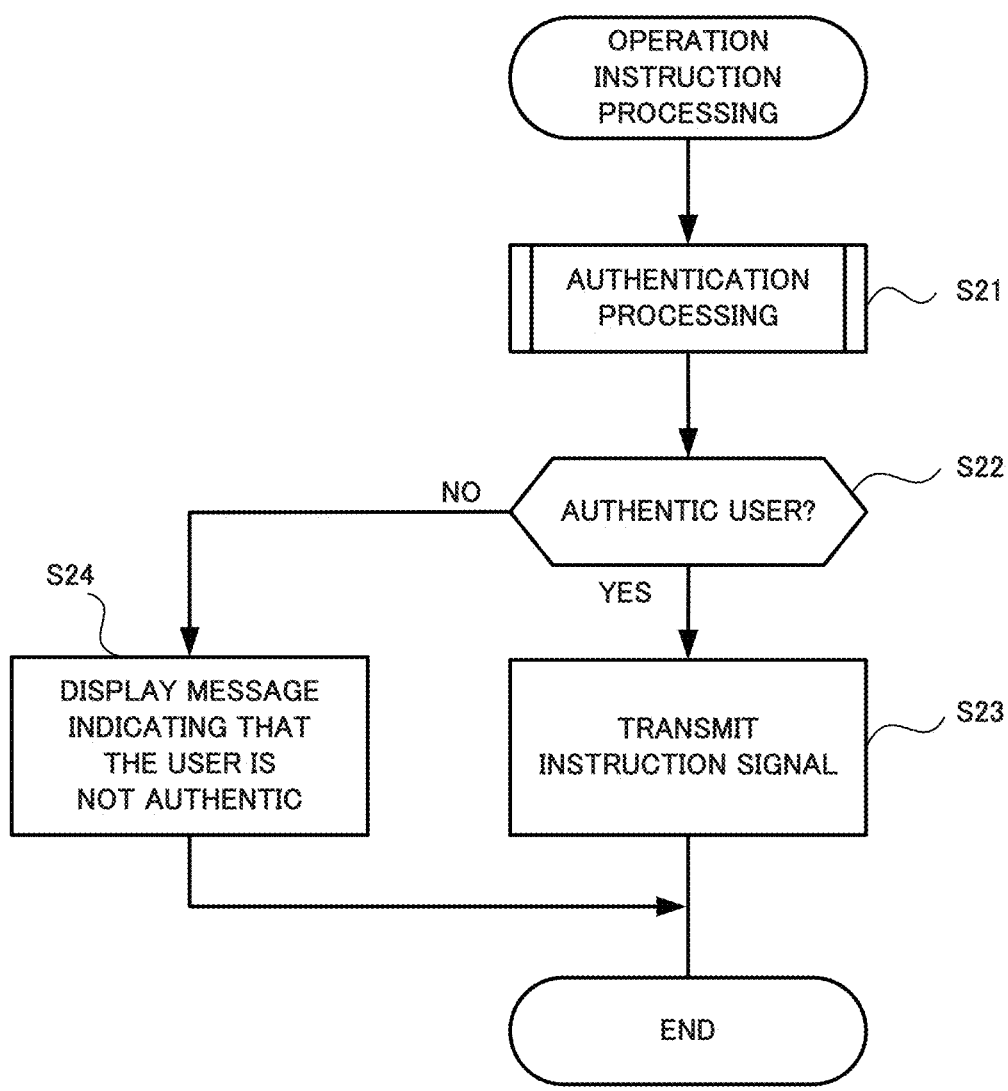
FIG. 8 is a flowchart of instruction processing.

When the operation menu illustrated in FIG. 6 is displayed in the processing at Step S13, the user presses (touches) a button corresponding to an operation that the user desires to instruct. In response to the pressing of the button, the operation instructor 183 of the terminal controller 18 starts the operation instruction processing illustrated in FIG. 8. When the operation instruction processing is started, the operation instructor 183 of the terminal controller 18 first executes the authentication processing (Step S21) described with reference to FIG. 4.

In the authentication processing, if the user is authenticated as an authentic user (Step S22: Yes), the operation instructor 183 of the terminal controller 18 transmits an instruction signal corresponding to the operated button via the near field communicator 10 (Step S23). This instruction signal includes the terminal ID of the transmission source mobile terminal 1, authentication information for authenticating the transmission source mobile terminal 1, the device ID of the device to be operated, and the content of the operation.

On the other hand, when the authentication is not successful (Step S22: No), the operation instructor 183 of the terminal controller 18 does not transmit the operation signal and displays a message indicating that the user is not a valid user on the display 19 illustrated in FIG. 2B (Step S24). The operation instructor 183 of the terminal controller 18 sets the operation in a difficult state and ends the processing.

Figure 9:
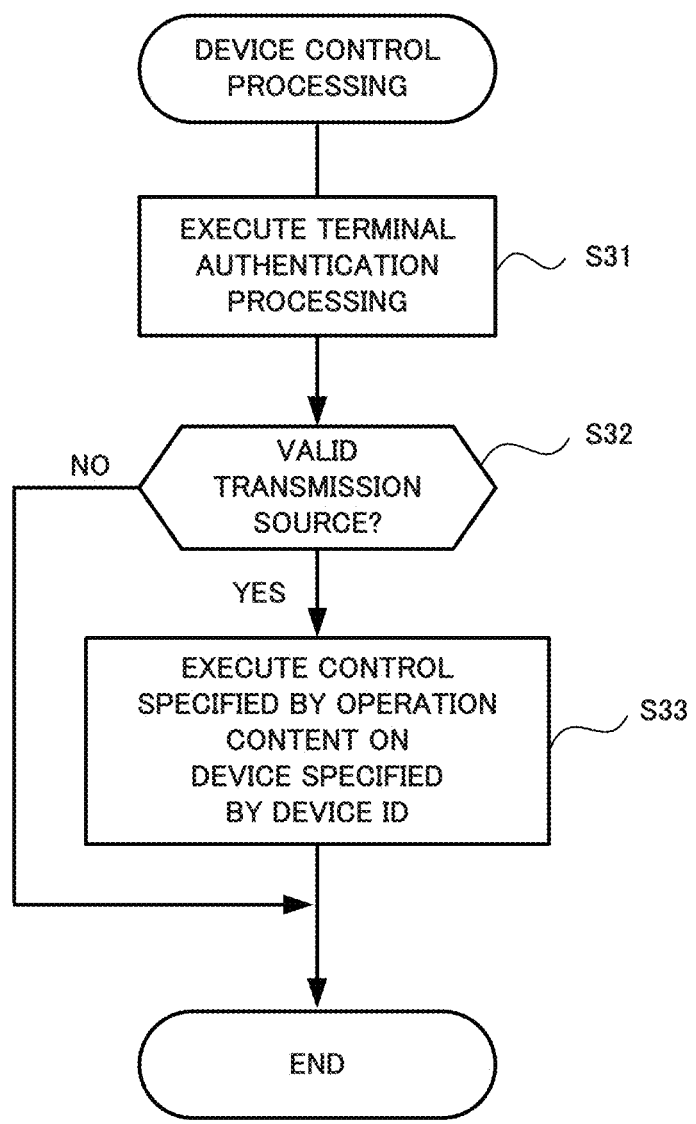
FIG. 9 is a flowchart of control processing according to Embodiment 1.

The device controller 51 of the control target vehicle 5 receives the instruction signal transmitted at Step S23 via the near field communicator 50. Upon receiving the operation signal, the device controller 51 starts the device control processing illustrated in FIG. 9. First, the device controller 51 executes terminal authentication processing for determining whether or not the transmission source mobile terminal 1 has an authority, based on the received terminal ID and authentication information (Step S31).

If the authentication is successful (Step S32: Yes), the device specified by the device ID included in the received operation signal is caused to execute the control specified by the operation content (Step S33), and the processing ends. On the other hand, if the authentication is not successful (Step S32: No), the processing ends without doing anything.

In this way, performing the authentication processing based on biometric information and habits of user's operation, makes it possible to provide a remote control device with high reliability that can operate a device with a simple operation.

Embodiment 2

The following will describe Embodiment 2 in which the remote control device can be used even more securely.

First of all, in the present embodiment, user registration processing for registering and setting a mobile terminal 1 as a remote controller for a vehicle 5 will be described with reference to FIG. 10. A terminal controller 18 of the mobile terminal 1, in response to an operation by a user, for example, first transmits a setting request to the vehicle 5 via a near field communicator 10 (Step S101). A device controller 51 of the vehicle 5 receives the setting request via, for example, a near field communicator 50. If the mobile terminal 1 is to be configured as a remote controller, the device controller 51 of the vehicle 5 transmits a setting permission signal in response to the user operation (Step S501).

Thereafter, communication between the terminal controller 18 of the mobile terminal 1 and the device controller 51 of the vehicle 5 is automatically repeated. First, the terminal controller 18 of the mobile terminal 1 receives the setting permission signal via the near field communicator 50. In response to the received setting permission signal, the terminal controller 18 transmits the terminal ID and PW (password) stored in the ID/PW storage 174 to the vehicle 5 (Step S102). The device controller 51 stores the transmitted terminal ID and PW (password) in the storage 52.

Next, the terminal controller 18 generates a private key and a public key. The terminal controller 18 stores the private key in a secure area of the terminal storage 17 (Step S103). The secure area means an area of the storage area of the terminal storage 17 that cannot be accessed until user authentication becomes successful.

The device controller 51 of the vehicle 5 generates challenge data in order to confirm validity of the mobile terminal 1. The device controller 51 transmits the generated challenge data to the mobile terminal 1 (Step S502). The terminal controller 18 of the mobile terminal 1 attaches a digital signature to the received challenge data using the private key, and transmits the challenge data together with the public key to the vehicle 5 (Step S104).

The device controller 51 of the vehicle 5 receives the challenge data, the digital signature, and the public key. The device controller 51 verifies the validity of the mobile terminal 1, based on the received challenge data and digital signature. If the verification is successful, the device controller 51 stores the public key of the mobile terminal 1 in the storage 52 (Step S503). The device controller 51 of the vehicle 5 generates a common key that is common to the mobile terminal 1 and the vehicle 5, for example, by generating a random number, and stores the common key in the storage 52. Further, the device controller 51 of the vehicle 5 encrypts the generated common key with the public key of the mobile terminal 1 and transmits the encrypted common key to the mobile terminal 1 (Step S504).

The terminal controller 18 of the mobile terminal 1 receives the common key and decrypts the common key with the private key. The terminal controller 18 of the mobile terminal 1 stores the decrypted common key in the secure area of the terminal storage 17 (Step S105). The terminal controller 18 of the mobile terminal 1 encrypts its own terminal ID and the application ID of the remote control program 175 with the decrypted common key. The terminal controller 18 attaches a digital signature generated with the common key to the encrypted terminal ID and application ID, and transmits the encrypted terminal ID and application ID to the vehicle 5 (Step S106). The device controller 51 of the vehicle 5 receives the terminal ID, digital signature, and the like of the mobile terminal 1. The device controller 51 verifies validity of the received information, such as the terminal ID, based on the received digital signature (Step S505). If the verification is successful, the device controller 51 of the vehicle 5 stores the received information, such as the terminal ID, in the storage 52 (Step S506).

Next, the device controller 51 of the vehicle 5 calculates a hash value of its own digital key. The device controller 51 encrypts the calculated hash value with the public key and transmits the encrypted hash value to the mobile terminal 1 (Step S507). The terminal controller 18 of the mobile terminal 1 receives the encrypted hash value of the digital key and decrypts the hash value with the private key. The terminal controller 18 stores the hash value of the decrypted digital key in a secure area of the terminal storage 17 (Step S107). Through the above processing, the mobile terminal 1 is registered as a remote control device of the vehicle 5.

Next, the processing of controlling the vehicle 5 using the mobile terminal 1 that was initially registered in this way will be described with reference to FIG. 11. As described in Embodiment 1, the user causes, for example, the display 19 of the mobile terminal 1 to display the operation menu exemplified in FIG. 6. The user touches a button on the operation menu depending to a content that the user desires to operate. The operation instructor 183 of the terminal controller 18 illustrated in FIG. 2D identifies this operation as operation request processing (Step S111).

Next, the personal authenticator 181 of the terminal controller 18 illustrated in FIG. 2D executes authentication processing for determining validity of the user (Step S112). The details of the authentication processing itself are the same as those of the processing described with reference to FIG. 4. When the authentication is successful, the operation instructor 183 of the terminal controller 18 generates a control command according to the touched button and transmits the control command to the vehicle 5 (Step S113). For example, if a lock button of the door device illustrated in FIG. 6 is touched, the operation instructor 183 of the terminal controller 18 generates a control command instructing locking with regard to the device ID by referring to the remote control target list illustrated in FIG. 5 and transmits the control command to the vehicle 5.

The device controller 51 illustrated in FIG. 2E receives the control command and stores the control command in the storage 52. Next, the device controller 51 generates a random number to generate challenge data, encrypts the challenge data with the common key, transmits the encrypted challenge data to the mobile terminal 1, and requests authentication again (Step S511).

The terminal controller 18 of the mobile terminal 1 receives and stores the challenge data. Next, the personal authenticator 181 of the terminal controller 18 illustrated in FIG. 2D executes the authentication processing illustrated in FIG. 4 (Step S114). In this way, validity of the user is determined. Here, if the authentication is successful, the terminal controller 18 encrypts, with the common key, the device ID of the vehicle 5, the terminal ID of the own mobile terminal 1, the application ID of the remote control program 175, the received hash value of the challenge data, and the hash value of the digital key received at the time of registration, which are then transmitted to the vehicle 5 (Step S115).

The device controller 51 of the vehicle 5 decrypts the received data with the common key and verifies whether each data is valid (Step S512). If the verification is successful, the device controller 51 controls the device according to the previously received control command (Step S513). For example, if the received command includes the content of "locking the device ID=D1," the device controller 51 refers to the remote control target list illustrated in FIG. 5 and controls to lock the key of the door device 53. In this way, the registered mobile terminal 1 can be used to control the vehicle 5.

Embodiment 3

In Embodiments 1 and 2, only one user can use one mobile terminal 1. However, the present disclosure is not limited to such cases, and various modifications are possible. The following will describe an example in which a plurality of people can use a single mobile terminal 1.

Figures 12, 13:
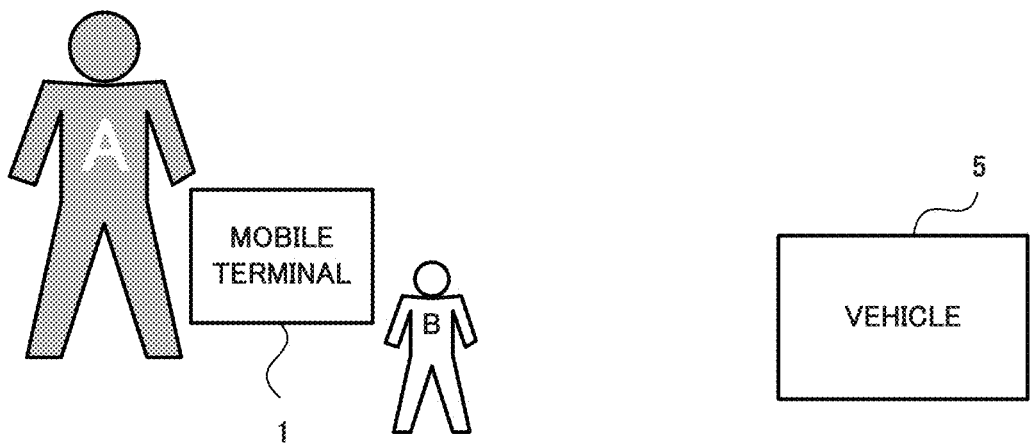
FIG. 12 is a diagram illustrating a usage scene according to Embodiment 3.
FIG. 13 is a diagram illustrating an example of a score value table for a sub-user according to Embodiment 3.

In this example, as illustrated in FIG. 12, an example in which user A and user B share a mobile terminal 1 as a remote control device will be described. However, the number of people is arbitrary. User A is the original user of the mobile terminal 1, and is authenticated by biometric information and the user's habit. Hereinafter, user A is referred to as a main user. On the other hand, user B is a person whose use has been approved by user A, and is hereinafter referred to as a sub-user. The main user and the sub-user are collectively referred to as the users.

The biometric information of the sub-user is stored in advance in an area for the sub-user of the biometric information database for authentication 171 stored in the terminal storage 17 of the mobile terminal 1 illustrated in FIG. 2B. Here, a face image for face recognition is assumed to be stored. With regard to the sub-user, authentication data related to the user's habit is set to 0 in the score value table 137A illustrated in FIG. 13. As the result, when the biometric authentication is successful, operation of the mobile terminal 1 as a remote control device is permitted.

Further, as illustrated in the remote control target list illustrated in FIG. 14, restrictions are set for the device that can be operated by the sub-user. No restrictions are set for the main user. Note that the operable range of the main user and the operable range of the sub-user may be the same.

Next, the operation when the settings are made in such a way will be described with reference to FIGS. 10 and 11. First, the registration operation may be the same as the processing illustrated in FIG. 10. Next, when the mobile terminal is actually used as a remote control device, the operation processing of FIG. 11 is executed. The user first causes, for example, the display 19 of the mobile terminal 1 to display the operation menu exemplified in FIG. 6. The user touches a button on the operation menu depending on a content that the user desires to operate. The operation instructor 183 of the terminal controller 18 illustrated in FIG. 2D identifies this operation as operation request processing (Step S111).

Next, the personal authenticator 181 of the terminal controller 18 illustrated in FIG. 2D executes authentication processing for determining validity of the user (Step S112). The details of the authentication processing itself are the same as those of the processing described with reference to FIG. 4. Here, when the user operating the mobile terminal 1 is the main user, the user is determined to be a valid user by biometric authentication and authentication of the user's habit. On the other hand, when the user operating the mobile terminal 1 is the sub-user, the user is determined to be a valid user by authentication using biometric information stored in a dedicated area. As such, the terminal controller 18 of the mobile terminal 1 can determine whether the user operating the mobile terminal 1 at that time of Step S111 is the main user or the sub-user.

At step S113, the terminal controller 18 of the mobile terminal 1 determines whether or not the button operated at Step S111 is permitted to the operating user, based on the remote control target list illustrated in FIG. 14. The terminal controller 18 of the mobile terminal 1 transmits a control command to the vehicle 5 only when the command can be operated.

For example, the sub-user is assumed to instruct operations of unlocking the door device 53 illustrated in FIG. 2E and turning on the ignition device 55 (ignition on). In the remote control target list illustrated in FIG. 14, the sub-user is set to be disabled to operate the door device 53 and the ignition device 55. Accordingly, in this case, the terminal controller 18 of the mobile terminal 1 does not send a control command to the vehicle 5.

Further, for example, the sub-user instructs an operation of turning on the air conditioning device 56 illustrated in FIG. 2E. In the remote control target list illustrated in FIG. 14, the sub-user is set to be enabled to operate the air conditioning device 56. Accordingly, in this case, the terminal controller 18 of the mobile terminal 1 transmits a control command to the vehicle 5.

Therefore, the main user can perform all the operations using the remote control device, and the sub-user can only perform some limited operations. In this way, a different security level can be set for each main user and sub-user.

Note that the mobile terminal 1 may not determine transmission/non-transmission of a control command, and the control target device may determine execution/non-execution of an operation command. In such a case, for example, the signal transmitted at Steps S113 and S115 includes user identification information indicating whether the user is the main user or the sub-user. At step S513 when executing the control command, the device controller 51 determines whether or not an operation instructed by a control command is permitted to the user, based on the user identification information, and controls according to the control command only when the operation is permitted to the user.

With such a configuration, a plurality of people can use a single mobile terminal 1 and operable contents can be set to be differentiated among the people.

Embodiment 4

In Embodiments 1 to 3, only one mobile terminal 1 can be used. However, the present disclosure is not limited to such cases, and various modifications are possible. The following will describe an example in which a plurality of mobile terminals 1 can be used.

Figures 15, 16:
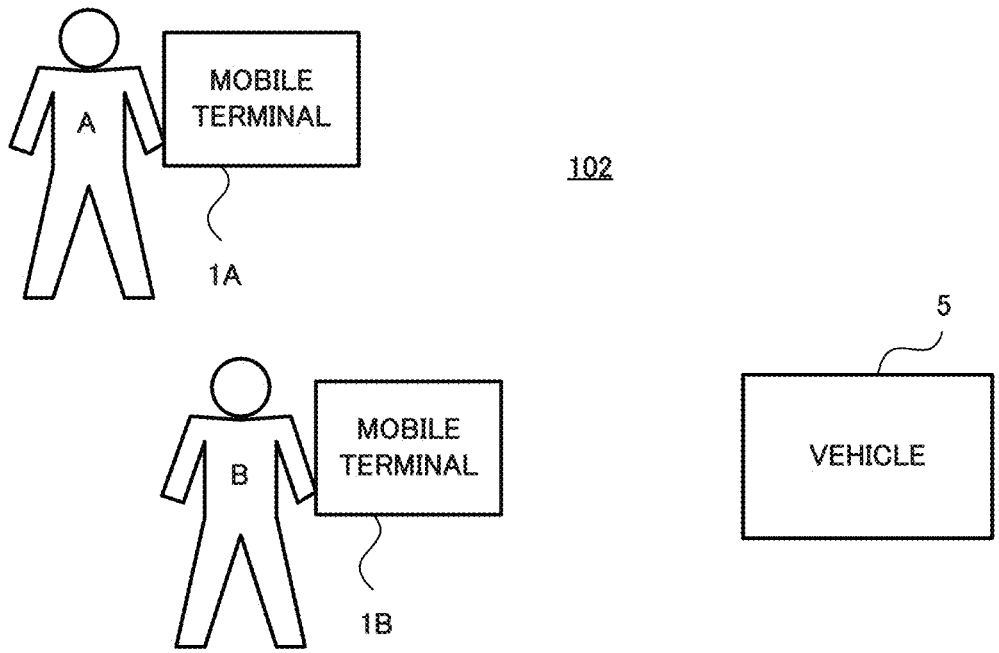
FIG. 15 is a diagram illustrating a usage scene of Embodiment 4.
FIG. 16 is a diagram illustrating an example of authority information according to Embodiment 4.

In this example, as illustrated in FIG. 15, an example in which user A and user B operate one vehicle 5 respectively using a mobile terminal 1A and a mobile terminal 1B as remote control devices will be described. However, the number of people and the number of terminals are arbitrary. All the mobile terminals 1 may have the setting of Embodiment 3, or some mobile terminals 1 may have the setting of Embodiment 3. Hereinafter, user A is referred to as the main user. The mobile terminal 1A is a mobile terminal for the main user, and is hereinafter referred to as the main terminal 1A. On the other hand, user B is a person whose use has been approved by user A, and is hereinafter referred to as the sub-user. The mobile terminal used by the sub-user is hereinafter referred to as the sub-terminal 1B.

Note that the remote control target list illustrated in FIG. 14 is stored in the terminal storage 17 of the sub-terminal 1B and the storage 52 of the vehicle 5. In this way, restrictions can be set for the operation of the sub-terminal 1B.

Figure 17:
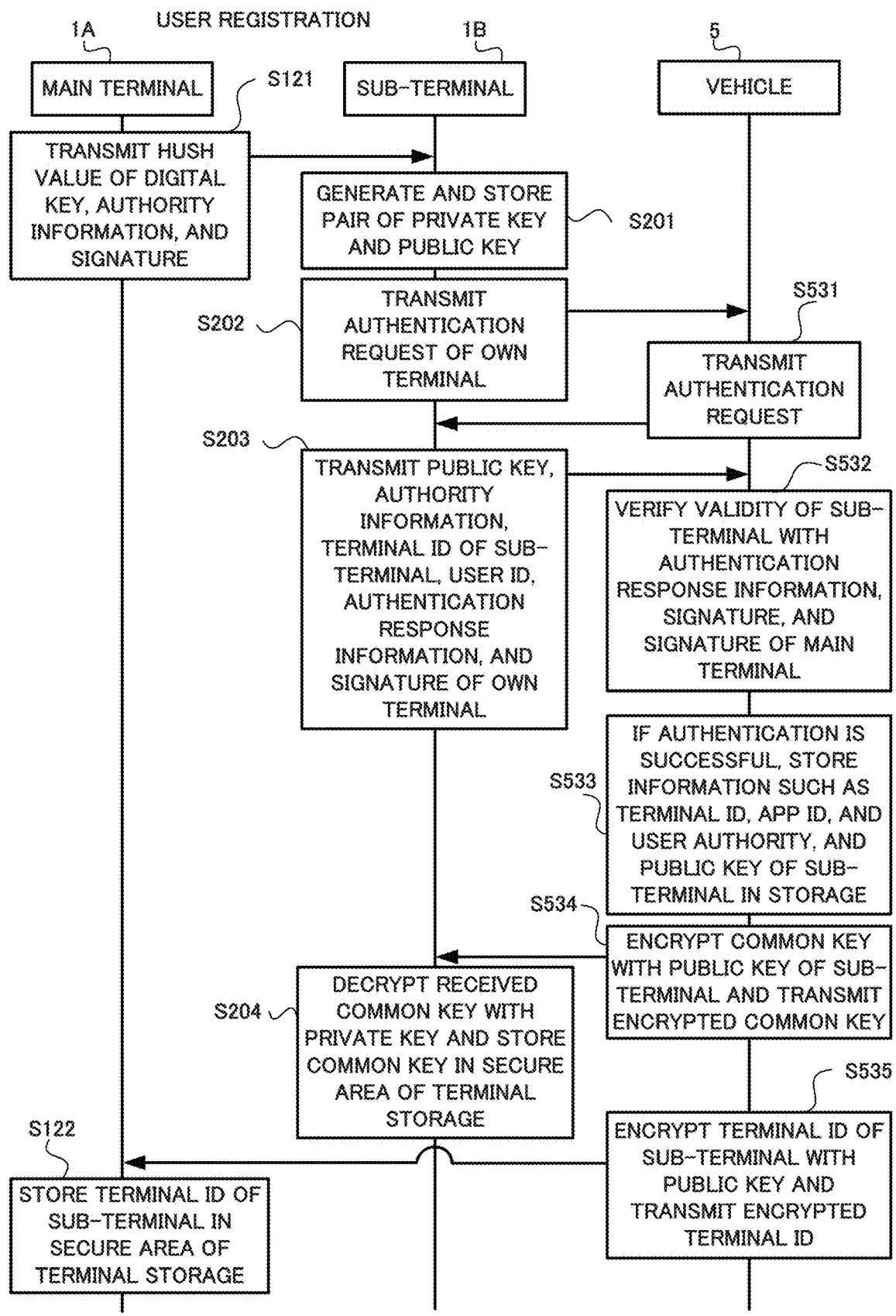
FIG. 17 is a sequence diagram of user registration processing according to Embodiment 4.

Next, an operation when the settings are made in such a way will be described with reference to FIGS. 11 and 17.

(User Registration Processing)

Figure 10:
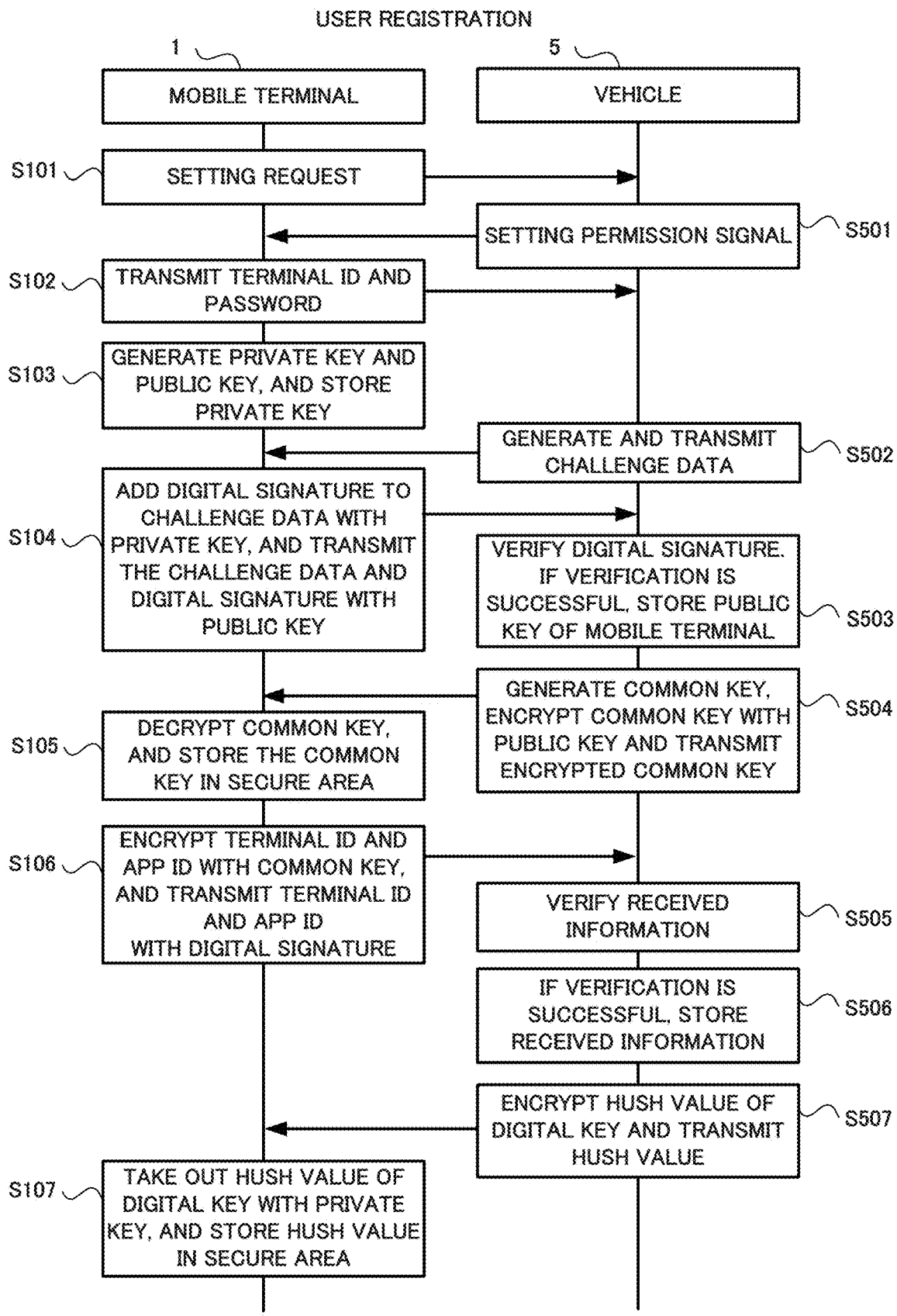
FIG. 10 is a sequence diagram of user registration processing according to Embodiment 2.

User registration processing is the same as the processing illustrated in FIG. 10 with regard to the main terminal 1A. On the other hand, the following user registration processing illustrated in FIG. 17 is required with regard to the sub-terminal 1B. Note that the following processing is based on the premise that authentication of the main terminal 1A and the sub-terminal 1B is successful. Further, the main terminal 1A sets the authority information illustrated in FIG. 16 based on the remote control target list illustrated in FIG. 14 as a range that can be operated by the sub-terminal 1B.

Next, user registration processing of the sub-terminal 1B will be described below with reference to FIG. 17. In response to an operation by the user, for example, the terminal controller 18 of the main terminal 1A transmits, to the sub-terminal 1B, a hash value of a digital key encrypted with a common key shared with the vehicle 5, authority information illustrated in FIG. 16, and a signature of the main terminal 1A, to the sub-terminal 1B (Step S121). The common key shared with the vehicle 5 is the common key received from the vehicle 5 at Step S104 of the user registration processing illustrated in FIG. 10. The terminal controller 18 of the sub-terminal 1B receives the encrypted hash value of the digital key, the signature of the main terminal 1A, and the like, which are then stored in the storage 52. The terminal controller 18 of the sub-terminal 1B further sets the remote control target list illustrated in FIG. 14 stored in the terminal storage 17, based on the authority information received from the main terminal 1A. Note that Step S121 is an example of the authority notification means described in the claims. Further, the terminal controller 18 of the sub-terminal 1B is an example of the setting means described in the claims.

Next, the terminal controller 18 of the sub-terminal 1B generates a pair of private key and public key and stores the private key and public key in a secure area of the terminal storage 17 (Step S201). The terminal controller 18 of the sub-terminal 1B requests the vehicle 5 to authenticate the sub-terminal 1B (Step S202).

In response to the authentication request, the device controller 51 of the vehicle 5 transmits the authentication request information to the sub-terminal 1B (Step S531). The terminal controller 18 of the sub-terminal 1B, in response to the authentication request information, produces the public key generated at Step S201, the authority information received from the main terminal 1A, the terminal ID of the sub-terminal 1B, the user ID of the sub-terminal 1B, the authentication response information for the authentication request, and the signature of the own terminal, which are then transmitted to the vehicle 5 (Step S203).

The device controller 51 of the vehicle 5 receives the information, verifies the authentication response information, the signature of the sub-terminal 1B, and the signature of the main terminal 1A, and verifies validity of the sub-terminal 1B (Step S532).

When the verification is successful, that is, the authentication is successful, the device controller 51 of the vehicle 5 stores information, such as the terminal ID of the sub-terminal 1B, application ID, and user authority, as well as, the public key of the sub-terminal 1B in the storage 52 (Step S533). The device controller 51 of the vehicle 5 encrypts the common key (the common key of the main terminal 1A and the vehicle 5) using the public key of the sub-terminal 1B and transmits the encrypted common key to the sub-terminal 1B (Step S534).

The terminal controller 18 of the sub-terminal 1B decrypts the received common key using the private key and stores the common key in a secure area of the terminal storage 17 (Step S204). On the other hand, the device controller 51 of the vehicle 5 encrypts the terminal ID of the sub-terminal 1B using the public key of the sub-terminal 1B and transmits the encrypted terminal ID to the main terminal 1A (Step S535).

The device controller 51 of the main terminal 1A decrypts the received terminal ID of the sub-terminal 1B and stores the terminal ID in the secure storage area of the terminal storage 17 (Step S122). The above processing completes the registration of the sub-terminal 1B.

Figure 11:
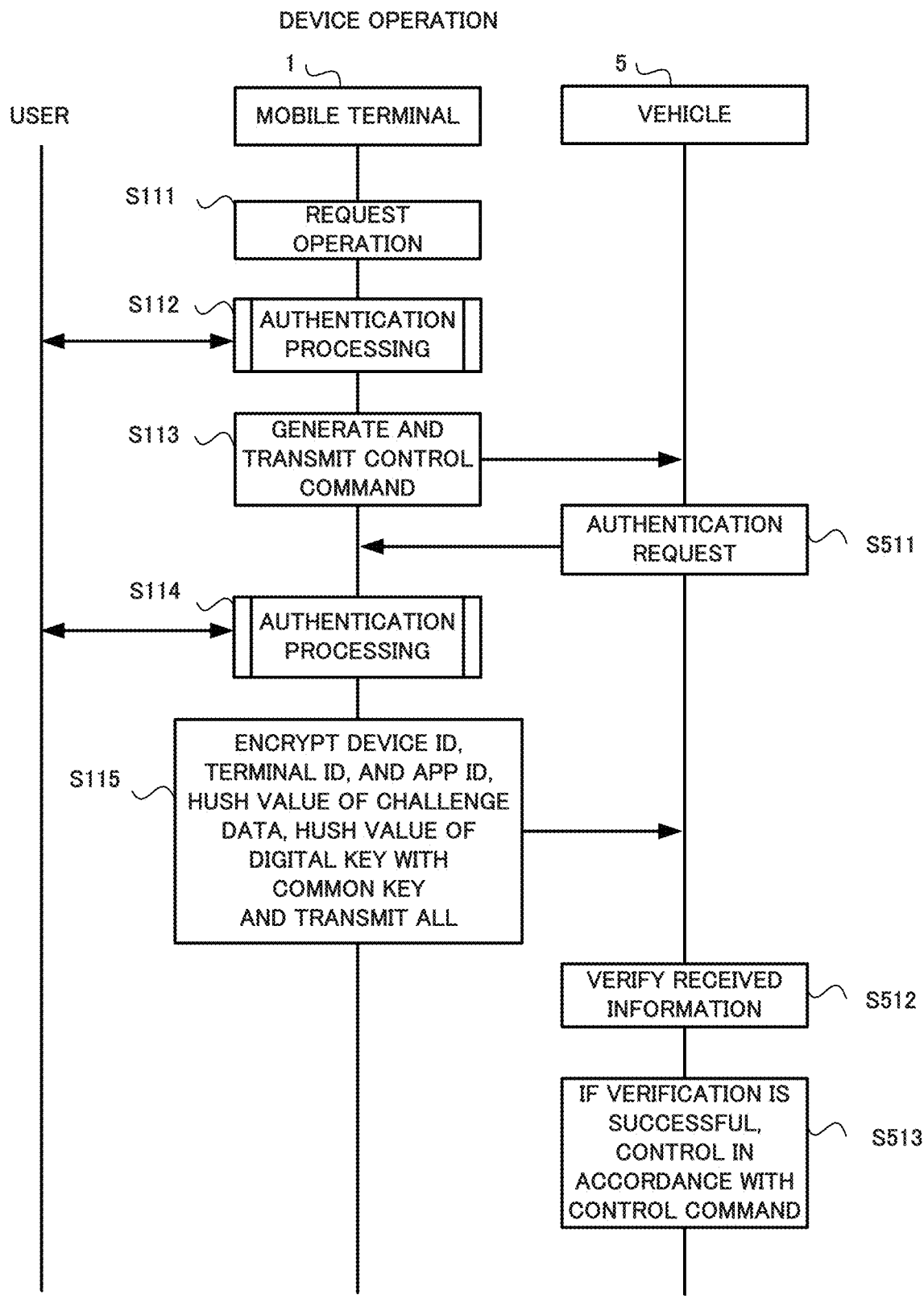
FIG. 11 is a sequence diagram of device operation processing according to Embodiment 2.

After the registration of the sub-terminal 1B is complete, the procedure for controlling the vehicle 5 using the sub-terminal 1B is substantially the same as the device operation processing in Embodiment 3 illustrated in FIG. 11.

As in Embodiment 3, when an operation for a device for which the sub-terminal 1B is not permitted or an operation for which the sub-terminal 1B is not permitted is selected, the operation is ignored by being judged based on the authority information stored in the sub-terminal 1B or the vehicle 5. The terminal controller 18 of the sub-terminal 1B may hide or display non-selectable buttons, based on the authority information.

Figure 18:
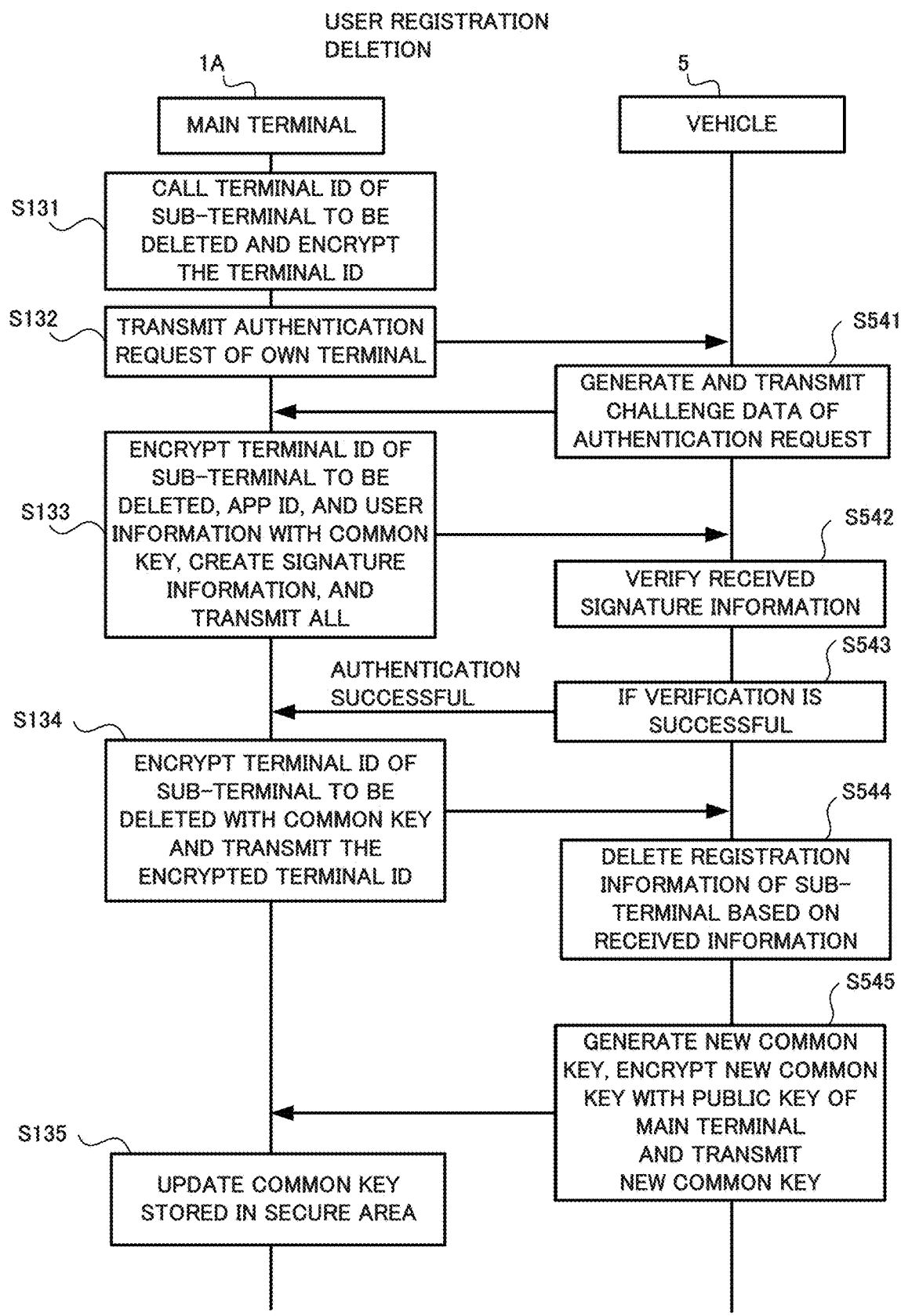
FIG. 18 is a sequence diagram of user registration deletion processing according to Embodiment 4.

In some cases, it may be necessary to delete a once registered sub-terminal. Only the main terminal 1A can desirably perform the processing of deleting the once registered sub-terminal. User registration deletion processing that is processing of deleting a once registered sub-terminal will be described below with reference to FIG. 18.

After being authenticated with the main terminal 1A, the main user causes the terminal controller 18 of the main terminal 1A illustrated in FIG. 2B to read the terminal ID of the sub-terminal to be deleted (here, the sub-terminal 1B) from the secure area of the terminal storage 17. The terminal controller 18 of the main terminal 1A encrypts the read terminal ID using the common key (Step S131).

The terminal controller 18 of the main terminal 1A transmits a request for authentication of the own terminal to the vehicle 5 (Step S132). The device controller 51 of the vehicle 5 generates challenge data in response to the authentication request and transmits the challenge data to the main terminal 1A (Step S541).

The terminal controller 18 of the main terminal 1A encrypts the terminal ID of the sub-terminal 1B to be deleted, application ID, and user information with the common key, creates signature information, and transmits the encrypted terminal ID, application ID, and user information, as well as, the signature information to the vehicle 5 (Step S133). The device controller 51 of the vehicle 5 receives the encrypted terminal ID, signature information, and the like, and verifies validity of the received terminal ID, user information, and the like, based on the received signature information (Step S542).

If the verification is successful, the device controller 51 of the vehicle 5 notifies the main terminal 1A of the success of the authentication (Step S543). The terminal controller 18 of the main terminal 1A encrypts the terminal ID of the sub-terminal 1B to be deleted with the common key and transmits the encrypted terminal ID to the vehicle 5 (Step S134). The device controller 51 of the vehicle 5 receives the encrypted terminal ID and deletes the registration information of the sub-terminal 1B, based on the received information (Step S544).

Next, the device controller 51 of the vehicle 5 generates a new common key and encrypts the new common key using the public key of the main terminal 1A. The device controller 51 of the vehicle 5 transmits the encrypted common key to the main terminal 1A (Step S545). The terminal controller 18 of the main terminal 1A updates the common key stored in the secure area (Step S135).

Through the above processing, the information of the sub-terminal 1B is deleted from the vehicle 5 and the main terminal 1A, and the sub-terminal 1B is no longer able to be used as a remote control device.

Embodiment 5

Unlike the authentication processing executed by the mobile terminal 1, the main terminal 1A, and the sub-terminal 1B according to the above-described Embodiments 1 to 4, a mobile terminal 1 according to Embodiment 5 uses user habit data for authentication when the result of authentication of a user who uses the mobile terminal 1 based on biometric information is a gray zone in which whether or not the user is an authentic user cannot be clearly determined. In this way, a user can be authenticated based on user habit data even when whether or not the user who uses the mobile terminal 1 is an authentic user cannot be clearly determined by authentication based on biometric information.

Figure 19:
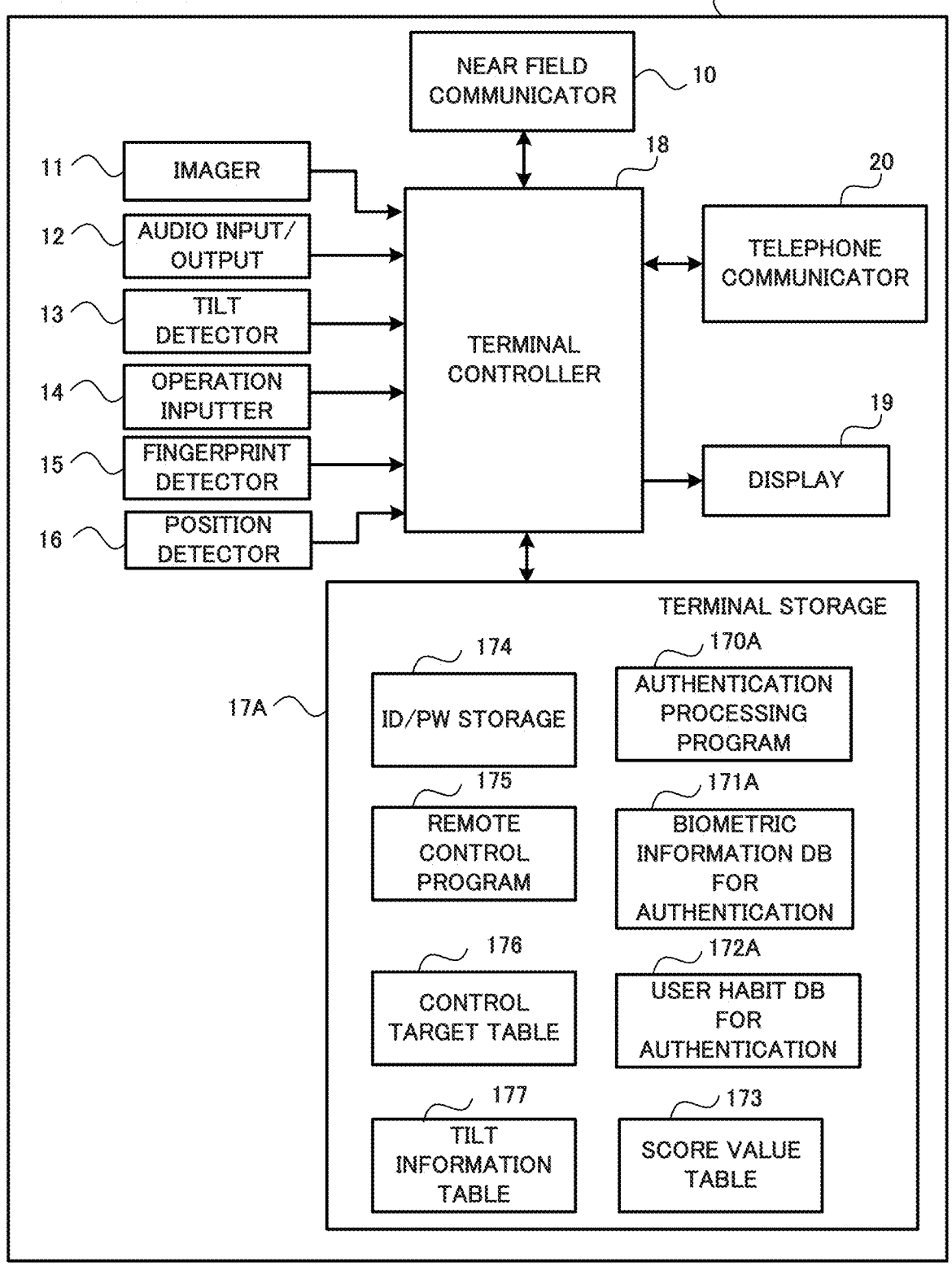
FIG. 19 is a configuration diagram of a mobile terminal according to Embodiment 5.

A block diagram illustrating the configuration of the mobile terminal 1 according to Embodiment 5 is illustrated in FIG. 19. This mobile terminal 1 comprises, in the terminal storage 17A, an authentication processing program 170A for performing the user authentication processing according to Embodiment 5, a biometric information database for authentication 171A that collects the biometric information of the user acquired by the mobile terminal 1, an user habit database for authentication 172A that collects user habit data acquired by the mobile terminal 1, and a tilt information table 177 for storing the tilt state of the mobile terminal 1.

The authentication processing program 170A is a program that performs processing for authenticating a user based on biometric information of the user and user habit data acquired by the mobile terminal 1. The biometric information database for authentication 171A is a database for storing information on the biometric information of the user and the authentication value used for authentication. The user habit database for authentication 172A is a database for storing information on a user-specific habit when a user operates the mobile terminal 1, an authentication pass condition, and the like. Here, the user-specific habit refers to something user-specific, such as an action when the user operates the mobile terminal 1, a distance between the screen of the display 19 and the user's face, a keystroke, the way of holding the mobile terminal 1, a place where the mobile terminal 1 is used, the number of connections to a specific communication network, launching of a specific application, and an operation.

The tilt information table 177 is a table for storing the tilt angle of the mobile terminal 1 detected by the tilt detector 13, the acquisition date and time, and the standby time for acquisition. The details of the biometric information database for authentication 171A, the user habit database for authentication 172A, and the tilt information table 177 will be described later.

Figure 20:
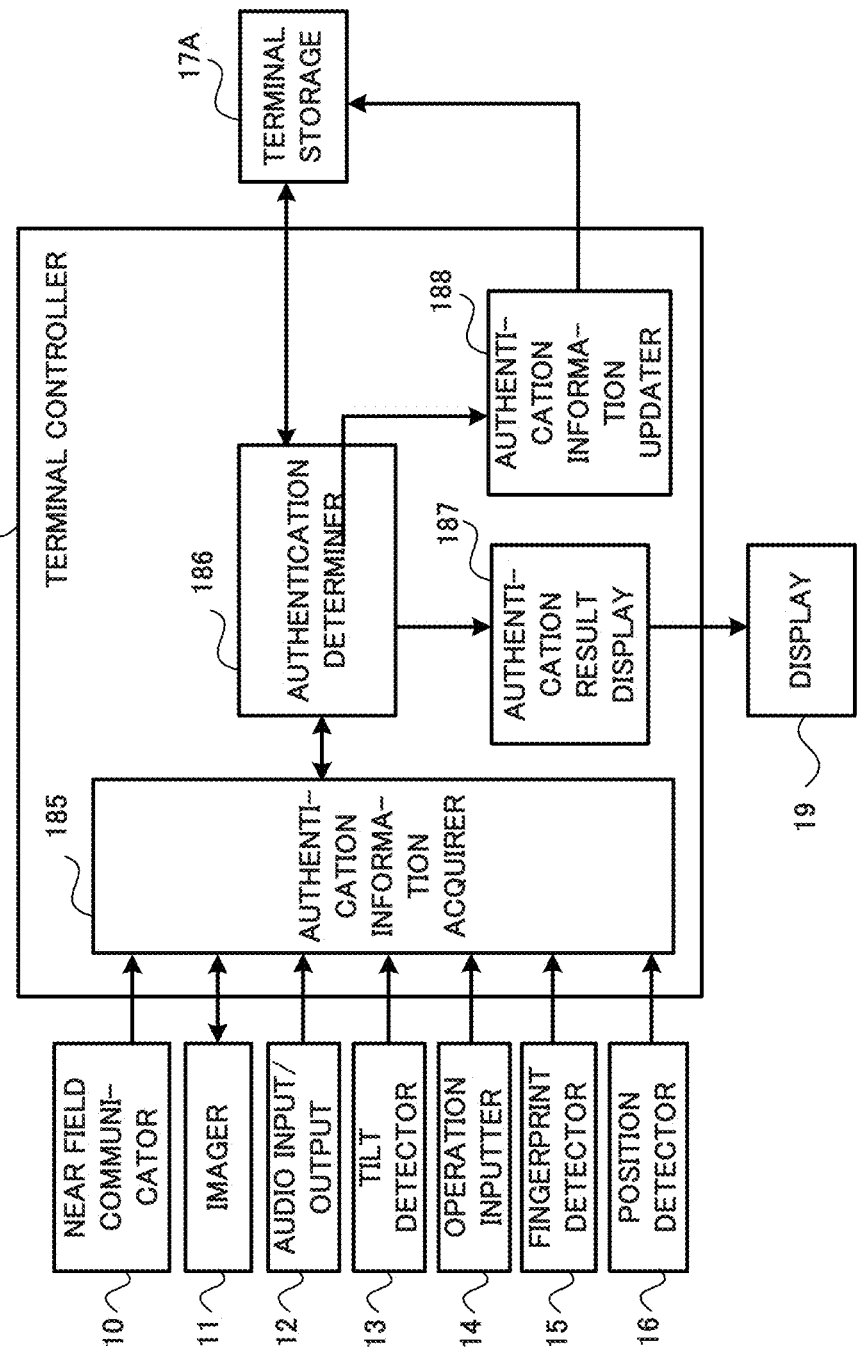
FIG. 20 is an information processing block diagram of the mobile terminal illustrated in FIG. 19.

The processor 21 of the mobile terminal 1 illustrated in FIG. 2C realizes the information processing block illustrated in FIG. 20 in the terminal controller 18 by executing the authentication processing program 170A stored in the terminal storage 17A of the mobile terminal 1 illustrated in FIG. 19. In this way, the mobile terminal 1 can authenticate a user based on biometric information, such as a face image, a fingerprint, and a voice print of the user, and user habit data, such as a specific behavior when the user operates the mobile terminal 1 and an operation state, to execute various functions in the mobile terminal 1.

The information processing block comprises an authentication information acquirer 185 that acquires biometric information and user habit data for authentication from the near field communicator 10, the imager 11, and the like, an authentication determiner 186 that authenticates whether or not the user is an authentic user, an authentication result display 187 that displays the authentication result on the display 19, and an authentication information updater 188 that updates the information of various databases and tables stored in the terminal storage 17A according to an instruction from the authentication determiner 186.

The authentication information acquirer 185 acquires biometric information and a user's habit for authentication from the near field communicator 10, the imager 11, and the like. The authentication determiner 186 authenticates a user based on the biometric information and user's habit for authentication acquired from the authentication information acquirer 185 and the authentication value, the pass condition, and the like stored in various databases of the terminal storage 17A. The authentication result display 187 receives the user's authentication result from the authentication determiner 186, and causes the display 19 to display a message, an image, and the like according to the authentication result. The authentication information updater 188 updates the data stored in various databases and tables stored in the terminal storage 17A, based on an instruction from the authentication determiner 186.

Note that biometric information acquired by the authentication information acquirer 185 is an example of the first biometric information and the second biometric information within the scope of the claims. Further, authentication of a user based on biometric information is an example of the first authentication means and the second authentication means within the scope of the claims.

Next, the configurations of the biometric information database for authentication 171A, the user habit database for authentication 172A, and the tilt information table 177 that are stored in the terminal storage 17A will be described below with reference to FIGS. 21A to 21C. First, as illustrated in FIG. 21A, the table of the biometric information database for authentication 171A stores types of biometric information, such as a face and a voice, registration information that is biometric information of a user themselves, and an average value of authentication values obtained from the registration information and biometric information acquired by the authentication information acquirer 185 illustrated in FIG. 20. The registration information stored in the table of the biometric information database for authentication 171A is the biometric information of the user themselves. The registration information is information registered in advance before authentication processing is performed in the mobile terminal 1, and is updated when the user themselves is successfully authenticated. In the registration information, for example, if the type of biometric information is face, a feature amount obtained from a face image is stored; if the type of biometric information is voice, voice data and/or a feature amount obtained from voice data is stored; if the type of biometric information is iris, iris data is stored; and, if the type of biometric information is fingerprint, a feature amount obtained from a fingerprint image is stored.

In the present embodiment, determination of similarity of biometric information is performed based on an authentication value. The authentication value is a value calculated based on the result of comparing the registration information with the biometric information acquired by the authentication information acquirer 185 illustrated in FIG. 20. The authentication value approaches 0 when the registration information and the biometric information acquired by the authentication information acquirer 185 are similar, and approaches 1 when they are not similar. The biometric information database for authentication 171A includes an average value of authentication values, an authentication threshold that is a threshold for judging an authentication value, and an authentication permissible value obtained by adding an authentication permissible range value indicating a case where a user is in a gray zone to the authentication threshold.

First, the average value of authentication values is an average value of the registration information and an authentication value obtained from biometric information acquired by the authentication information acquirer 185. The authentication threshold is a reference value for comparing the registration information with the biometric information acquired by the authentication information acquirer 185, and judging that a user is an authentic user when the authentication value calculated based on the comparison result is less than or equal to the authentication threshold. The authentication threshold is a value that fluctuates according to the authentication state of a user, and the upper limit value is defined in advance. The upper limit value is a value where the user should not be authenticated as an authentic user only with the biometric information when the authentication value is equal to or greater than the upper limit value. For example, when a default value of authentication threshold is 0.4, which is between 0 that the authentication value approaches when the registration information and the biometric information acquired by the authentication information acquirer 185 are similar and 1 that the authentication value approaches 1 when they are not similar, the upper limit of the authentication threshold is 0.45. Further, the authentication permissible value is a reference value for comparing the registration information with the biometric information acquired by the authentication information acquirer 185 and judging that a user is not an authentic user when the authentication value calculated based on the comparison result is equal to or greater than the authentication permissible value. Since the authentication permissible value is a value obtained by adding an authentication permissible range value indicating that a user is in a gray zone to the authentication threshold, the authentication permissible value fluctuates according to the fluctuation of the authentication threshold and the authentication permissible range value. An upper limit value is defined in advance for the authentication permissible value, which is called the maximum authentication permissible value. The maximum authentication permissible value is a value where the user should be judged as a different person when the authentication value is equal to or greater than the maximum authentication permissible value. For example, the maximum authentication permissible value is 0.5, which is an intermediate value between 0 that the authentication value approaches when the registration information and biometric information acquired by the authentication information acquirer 185 are similar and 1 that the authentication value approaches when they are not similar.

A value between the authentication threshold and the authentication permissible value is called an authentication permissible range value, and indicates whether or not the user is an authentic user is in a gray zone. When an authentication value is within the authentication permissible range value, whether or not a user is an authentic user is not judged only by biometric information, but rather, the user is authenticated as an authentic user when a user's habit peculiar to the user matches a pass condition, and the user is not authenticated when the user's habit does not match the pass condition. User authentication based on a user's habit is hereinafter referred to as auxiliary authentication. The authentication permissible range value is a predetermined value where a user may generally be considered authentic when an authentication value falls within this range. For example, the authentication permissible range value is 0.08 which is less than 10% of a range between 0 that an authentication value approaches in a similar case and 1 that an authentication value approaches in a dissimilar case. Note that, when the authentication threshold is the upper limit value, the authentication permissible range value becomes a value obtained by subtracting the upper limit value, which is the authentication threshold, from the maximum authentication permissible value. For example, when the upper limit of the authentication threshold is 0.45 and the maximum authentication value is 0.5, the authentication permissible range value is 0.05. Therefore, when the authentication threshold is the upper limit value, the authentication permissible range value takes a smaller value than when the authentication threshold value is not the upper limit value.

Next, the table of the user habit database for authentication 172A will be described below with reference to FIG. 21B. The table of the user habit database for authentication 172A stores the types of user's habits, such as communication connection and event execution, the acquired information acquired by the authentication information acquirer 185 illustrated in FIG. 20, the latest state of each user's habit, and the pass condition for each user's habit. In the acquired information, for example, if the user's habit type is communication connection, a connection destination address, a service set identifier (SSID), a basic service set identifier (BSSID), or the like is stored; if the user's habit type is event execution, location information such as the name and address of a location where an event is held, which is saved in a schedule book in advance, is stored; if the user's habit type is the distance between the user's face and the terminal device, a distance is stored; and if the user's habit type is connection destination, a name, ID, and the like indicating a connection destination device is stored.

The latest state of each user's habit is, for example, the total number of times that the communication connection destination indicated in the acquired information has been connected so far if the user's habit type is communication connection. The initial value of the total number of connections to the communication connection destination is 0, and the number of connections increments by each connection made to the communication connection destination. Likewise, if the user's habit type is event execution, the distance between the location stored in the acquired information and the user's current position is stored. If the user's habit type is the distance between the face and the mobile terminal 1, the average distance of distances between the face and the mobile terminal 1 that have been calculated when the user was authenticated as an authentic user is stored. The average distance between the face and the mobile terminal 1 is updated each time the user is authenticated as an authentic user. Note that the initial value of the average distance between the face and the mobile terminal 1 is the distance calculated when the biometric information illustrated in FIG. 21A is registered in advance before the user is authenticated by the mobile terminal 1.

If the user's habit type is device connection, whether or not the user is connected to the device indicated by the name, ID, or the like stored in the acquired information is stored. The device connection is, for example, connection between the device and the mobile terminal 1 paired by Bluetooth (registered trademark). The pass condition of each user's habit is a condition that predefines a condition that can guarantee reliability of each user's habit.

Next, the table of the tilt information table 177 is illustrated in FIG. 21C. The tilt information table 177 stores an angle indicating the tilt of the mobile terminal 1 acquired by the tilt detector 13 illustrated in FIG. 20, acquisition date and time when the angle was acquired, and standby time which is an interval for detecting the tilt. The angle indicating the tilt of the mobile terminal 1 is acquired by the authentication information acquirer 185 shown in FIG. 20 from the tilt detector 13 every time the standby time elapses, and updated. When the angle is updated, the acquisition date and time when the angle is acquired is also updated.

When the mobile terminal 1 according to the present embodiment completes execution of initialization processing as processing after powering on the mobile terminal 1 or returns from a sleep state, the mobile terminal 1 enters a locked state in which the operation of each function is not permitted until the authentication becomes successful. When authentication is required when entering this locked state or operating each function, the terminal controller 18 of the mobile terminal 1 illustrated in FIG. 19 executes the authentication processing program 170A stored in the terminal storage 17A to determine whether or not the user is an authentic user. The user authentication processing by the authentication processing program 170A is performed in the background at a predetermined authentication interval.

As such, to use the user authentication processing by the authentication processing program 170A as the authentication processing in Embodiments 1 to 4, the main user and the sub-user may be authenticated in the background as necessary while the main terminal 1A and the sub-terminal 1B are operating, and the authentication result may be used at each step of the flowcharts illustrated in FIGS. 7, 11, 17, and 18. The processing of the authentication processing program 170A executed by the terminal controller 18 will be described below with reference to the authentication processing flowcharts illustrated in FIGS. 22A and 22B.

Figure 22A:
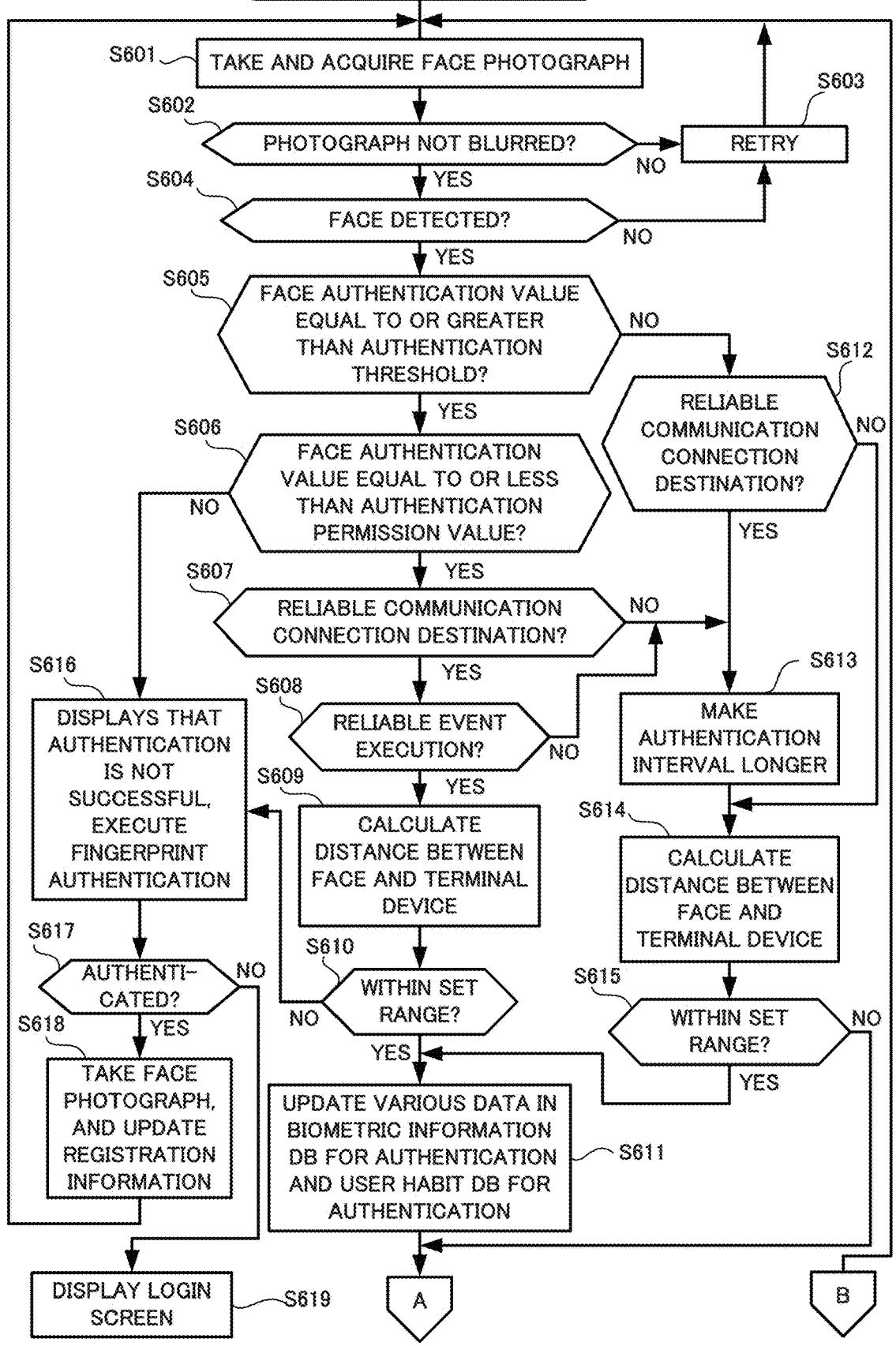
FIG. 22A is a flowchart of authentication processing according to Embodiment 5.

First, referring to FIG. 22A. In the present embodiment, a face image of a user is used as biometric information. The authentication information acquirer 185 illustrated in FIG. 20 causes the imager 11 to take a photograph of the face of the user operating the mobile terminal 1. Specifically, the authentication information acquirer 185 causes the in-camera 11A to take a photograph of the face of the user facing the front surface of the mobile terminal 1. The authentication information acquirer 185 acquires the user's face photograph from the imager 11 (Step S601). The authentication information acquirer 185 judges whether or not the acquired user's face photograph is blurred (Step S602). If the user's face photograph is blurred (Step S602; NO), the authentication information acquirer 185 causes the imager 11 to retry taking the user's face photograph (Step S603). If the user's face photograph is not blurred (Step S602; YES), the authentication information acquirer 185 judges whether the user's face can be detected from the user's face photograph taken by the imager 11 (Step S604).

When the user's face cannot be detected from the user's face photograph (Step S604; NO), the authentication information acquirer 185 causes the imager 11 to retry taking the user's face photograph (Step S603). Note that, if the user's face cannot be detected from the user's face photograph, the user who is currently operating may be locked to prevent further operations, a message to the effect that other authentication method will be used may be displayed, or other measures may be taken. When the user's face can be detected from the user's face photograph (Step S604; YES), the authentication information acquirer 185 calculates the feature amount of the detected user's face image. The authentication information acquirer 185 transmits the calculated feature amount of the user's face image to the authentication determiner 186.

The authentication determiner 186 acquires the biometric information database for authentication 171A stored in the terminal storage 17A illustrated in FIG. 19. From the table of the biometric information database for authentication 171A illustrated in FIG. 21A, the authentication determiner 186 acquires the feature amount of the face image stored in the registration information associated with the "face" among the types of biometric information, and also acquires the corresponding authentication permissible value and authentication threshold. The authentication determiner 186 compares the feature amount of the face image of the registered information acquired from the biometric information database for authentication 171A with the feature amount of the face image received from the authentication information acquirer 185, and calculates the face authentication value based on the comparison result. The authentication determiner 186 determines whether the calculated face authentication value is equal to or greater than the authentication threshold acquired from the biometric information database for authentication 171A (Step S605).

When the calculated face authentication value is equal to or greater than the authentication threshold (Step S605; YES), the authentication determiner 186 judges whether the calculated face authentication value is equal to or less than the authentication permissible value acquired from the biometric information database for authentication 171A (Step S606). When the calculated face authentication value is equal to or less than the authentication permissible value (Step S606; YES), whether or not the user using the mobile terminal 1 is an authentic user is in a gray zone, thus, the authentication determiner 186 performs auxiliary authentication that authenticates the user according to the user's habit. First, the authentication determiner 186 causes the authentication information acquirer 185 to acquire the communication connection destination that is currently connected via the near field communicator 10. The authentication determiner 186 receives the acquired current communication connection destination of the near field communicator 10 from the authentication information acquirer 185.

Subsequently, the authentication determiner 186 acquires the user habit database for authentication 172A from the terminal storage 17A illustrated in FIG. 19. The authentication determiner 186 acquires the acquired information, the number of times, and the pass condition associated with the "communication connection" among the types of user habits stored in the table of user habit database for authentication 172A illustrated in FIG. 21B. For example, as illustrated in FIG. 21B, ABC_WLAN and 123WLAN, which are SSIDs, are stored in the acquired information of the "communication connection." With regard to the ABC_WLAN, "31 times" is stored as the number of times of connections and "100 times or more" is stored as the number of times of connections as a pass condition. Further, with regard to the 123 WLAN, "157 times" is stored as the number of times of connections and "100 times or more" is stored as the number of times of connections as a pass condition. Note that, in the following description, a case where the pass condition is satisfied is referred to as reliable, and a case where the pass condition is not satisfied is referred to as unreliable.

The authentication determiner 186 compares the current communication connection destination of the near field communicator 10 received from the authentication information acquirer 185 with the acquired information acquired from the user habit database for authentication 172A, and judges whether or not the current communication connection destination is a reliable connection destination (Step S607). Here, for example, the SSID ABC_WLAN is assumed to be acquired as the current communication connection destination of the near field communicator 10. The ABC_WLAN in the acquired information of the user's habit type "communication connection" stored in the user habit database for authentication 172A has connected 31 times and a pass condition is 100 or more times of connections. Therefore, since the current communication connection destination is an unreliable communication connection destination (Step S607; YES), whether or not a reliable event is being executed is judged (Step S608).

The authentication determiner 186 causes the authentication information acquirer 185 to acquire the content of the event executed immediately before from the operation inputter 14. The authentication determiner 186 acquires from the calendar equipped in the mobile terminal 1 whether or not there is a schedule at the current date and time, and information on the location where the schedule is carried out. If there is no schedule on that day, the authentication determiner 186 assumes that the event is unreliable (Step S608; YES), and calculates the distance between the face and the mobile terminal 1 (Step S609). If there is a schedule on that day, the authentication determiner 186 causes the authentication information acquirer 185 to acquire the current position information from the position detector 16. Subsequently, the authentication determiner 186 acquires the user habit database for authentication 172A from the terminal storage 17A illustrated in FIG. 19.

The authentication determiner 186 acquires the acquired information and the pass condition associated with "event execution" among the types of user habits stored in the table of the user habit database for authentication 172A illustrated in FIG. 21B. For example, as illustrated in FIG. 21B, "○× park" and "▲● movie theater" are stored as a location where an event is held in the acquired information of "event execution", and "within 100 m in distance" is stored as a pass condition for both cases.

Here, for example, "○× park" is assumed to be stored in the calendar equipped in the mobile terminal 1 as the location of an event to be held at the current date and time. The authentication determiner 186 compares the current position information acquired by the authentication information acquirer 185 from the position detector 16 with the position information of "○× park" that is the location of the event to be held at the current date and time. For example, the distance between the current position information and the position information of the event location "○× park" is assumed to be 113 m. In this case, the event executed is unreliable (Step S608; YES), and the distance between the face and the mobile terminal 1 is calculated (Step S609). The distance between the user's face and the mobile terminal 1 is calculated based on the ratio of the user's face in the photograph of the user's face facing the front surface of the mobile terminal 1 taken with the in-camera 11A illustrated in FIG. 1.

Subsequently, the authentication determiner 186 acquires the user habit database for authentication 172A from the terminal storage 17A illustrated in FIG. 19. The authentication determiner 186 acquires the average distance and pass condition corresponding to the "distance between the face and the terminal device" among the types of user's habits stored in the table of the user habit database for authentication 172A illustrated in FIG. 21B. For example, as illustrated in FIG. 21B, the average distance of the "distance between the face and the terminal device" is 262 mm, and plus or minus 20 mm of the average distance is stored as the pass condition.

The authentication determiner 186 judges whether or not the distance between the user's face and the mobile terminal 1 calculated at Step S509 is within the setting range set as the pass condition acquired from the user habit database for authentication 172A (Step S610). Specifically, the average distance acquired from the user habit database for authentication 172A is 262 mm, and the pass condition is plus or minus 20 mm of the average distance, thus, whether or not the distance is in the range of 242 mm to 282 mm is judged.

When the distance between the user's face and the mobile terminal 1 calculated at Step S509 is in the range of 242 mm to 282 mm (Step S610; YES), the authentication determiner 186 authenticates that the user using the mobile terminal 1 is an authentic user. The mobile terminal 1 causes the authentication information updater 188 to update various data stored in the biometric information database for authentication 171A and the user habit database for authentication 172A illustrated in FIG. 19 (Step S611).

Specifically, the authentication information updater 188 updates the registration information associated with the type of biometric information "face" in the table of the biometric information database for authentication 171A illustrated in FIG. 21A by adding the feature amount of the face image received by the authentication determiner 186 from the authentication information acquirer 185 to the feature amount of the face image stored in the registration information. Subsequently, the authentication information updater 188 increments by one and updates the number of times stored in the latest state associated with the type of user's habit "communication connection" in the table of the user habit database for authentication 172A illustrated in FIG. 21B. Further, the latest state associated with the type of user's habit "distance between the face and the terminal device" stored in the table of the user habit database for authentication 172A illustrated in FIG. 21B is updated with the average distance calculated from the stored average distance and the "distance between the face and the terminal device" calculated at Step S609.

Updating biometric information stored in the biometric information database for authentication 171A and user's habit stored in the user habit database for authentication 172A in this way, improves the accuracy of the user's biometric information and the user's habit. As such, the accuracy of user authentication can be improved.

When the authentication value of the face calculated by the authentication determiner 186 is less than the authentication threshold of authentication value (Step S605; NO), the authentication determiner 186 causes the authentication information acquirer 185 to acquire a currently connected communication destination from the near field communicator 10. The authentication determiner 186 receives the current communication connection destination of the near field communicator 10 acquired by the authentication information acquirer 185. Subsequently, the authentication determiner 186 acquires the user habit database for authentication 172A from the terminal storage 17A illustrated in FIG. 19. The authentication determiner 186 acquires the acquired information, the number of times, and the pass condition associated with the "communication connection" among the types of user habits stored in the table of the user habit database for authentication 172A illustrated in FIG. 21B. The authentication determiner 186 compares the current communication connection destination of the near field communicator 10 received from the authentication information acquirer 185 with the acquired information acquired from the user habit database for authentication 172A, and determines whether or not the current communication connection destination is a reliable connection destination (Step S612).

Here, for example, the SSID 123 WLAN is assumed to be acquired as the current communication connection destination of the near field communicator 10. The 123 WLAN in the acquired information of the user's habit type "communication connection" stored in the user habit database for authentication 172A has connected 156 times and a pass condition is 100 or more times of connections. Therefore, since the current communication connection destination is a reliable communication connection destination (Step S612; YES), the authentication determiner 186 authenticates the user using the mobile terminal 1 as an authentic user. Thereafter, the authentication determiner 186 makes the authentication interval longer than the current authentication interval (Step S613). This is because if the current communication connection destination is a reliable communication connection destination, the user themselves is considered to be in a reliable environment such as at home or workplace. In this case, the authentication interval may be made longer than the current authentication interval to reduce the frequency of authentication, and the authentication may be performed the minimum number of times necessary.

Here, for example, the SSID ABC_WLAN is assumed to be acquired as the current communication connection destination of the near field communicator 10. The ABC_WLAN in the acquired information of the user's habit type "communication connection" stored in the user habit database for authentication 172A has connected 31 times and a pass condition is 100 or more times of connections. Therefore, since the current communication connection destination is not a reliable communication connection destination (Step S612; NO), the authentication determiner 186 does not authenticate the user using the mobile terminal 1 as an authentic user, and does not set the authentication interval longer than the current authentication interval.

Here, at Step S607, for example, the SSID 123 WLAN is assumed to be acquired as the current communication connection destination of the near field communicator 10. The 123 WLAN in the acquired information of the user's habit type "communication connection" stored in the user habit database for authentication 172A has connected 156 times and a pass condition is 100 or more times of connections. Therefore, since the current communication connection destination is a reliable communication connection destination (Step S607; NO), the authentication determiner 186 authenticates the user using the mobile terminal 1 as an authentic user.

Here, at Step S608, for example, "▲● movie theater" is assumed to be stored in the calendar equipped in the mobile terminal 1 as the location of an event to be held at the current date and time. The authentication determiner 186 compares the current position information acquired by the authentication information acquirer 185 from the position detector 16 with the position information of "▲● movie theater" that is the location of the event to be held at the current date and time. For example, the distance between the current position information and the position information of the event location "▲● movie theater" is assumed to be 72 m. In this case, execution of a reliable event is determined (Step S608; NO), and the authentication determiner 186 authenticates the user using the mobile terminal 1 as an authentic user. Thereafter, the authentication determiner 186 makes the authentication interval longer than the current authentication interval (Step S613).

The authentication determiner 186 calculates the distance between the user's face and the mobile terminal 1 (Step S614). Subsequently, the authentication determiner 186 acquires the user habit database for authentication 172A from the terminal storage 17A illustrated in FIG. 19. The authentication determiner 186 determines whether or not the distance between the user's face and the mobile terminal 1 calculated at Step S614 is within the setting range set in the pass condition acquired from the user habit database for authentication 172A (Step S615). When the distance between the user's face and the mobile terminal 1 calculated at Step S609 is within the setting range (Step S615; YES), the authentication determiner 186 authenticates the user using the mobile terminal 1 as an authentic user. The authentication determiner 186 causes the authentication information updater 188 to update various data stored in the biometric information database for authentication 171A and the user habit database for authentication 172A illustrated in FIG. 19 (Step S611).

Specifically, the authentication information updater 188 updates the registration information associated with the type of biometric information "face" in the table of the biometric information database for authentication 171A illustrated in FIG. 21A by adding the feature amount of the face image received by the authentication determiner 186 from the authentication information acquirer 185 at Step S605 to the feature amount of the face image stored in the registration information.

Next, the authentication information updater 188 increments by one and updates the number of times stored in the latest state associated with the type of user's habit "communication connection" in the table of the user habit database for authentication 172A illustrated in FIG. 21B. Subsequently, the authentication information updater 188 writes and updates the distance between the location of the event obtained at Step S608; NO and the mobile terminal 1 in the latest state corresponding to the type of user's habit "event execution" in the table of the user habit database for authentication 172A. Further, the latest state associated with the type of user's habit "distance between the face and the terminal device" stored in the table of the user habit database for authentication 172A illustrated in FIG. 21B is updated with the average distance calculated using the average distance stored in the latest state and the "distance between the face and the terminal device" calculated at Step S614.

When the distance between the user's face and the mobile terminal 1 calculated at Step S614 is not within the setting range (Step S615; NO), the authentication determiner 186 does not cause the authentication information updater 188 to update various data stored in the biometric information database for authentication 171A and the user habit database for authentication 172A illustrated in FIG. 19.

Further, when the face authentication value obtained by the authentication determiner 186 is not equal to or less than the authentication permissible value of authentication value (Step S606; NO), and the distance between the face and the terminal device is not within the setting range at Step S610 (Step S610; NO), the authentication determiner 186 judges that the user using the mobile terminal 1 is not an authentic user. The authentication determiner 186 causes the authentication result display 187 illustrated in FIG. 20 to display on the display 19 that the authentication is not successful. Subsequently, the authentication determiner 186 invokes existing biometric authentication means equipped in the mobile terminal 1. Here, fingerprint authentication is assumed to be invoked as the existing biometric authentication means. The authentication determiner 186 executes the fingerprint authentication (Step S616).

When the fingerprint authentication is successful (Step S617; YES), the authentication information acquirer 185 causes the imager 11 to take a face photograph of the user operating the mobile terminal 1 in accordance with an instruction from the authentication determiner 186. The authentication information acquirer 185 acquires the image of the user's face photograph from the imager 11 and calculates a feature amount of the user's face image. The authentication information acquirer 185 transmits the calculated feature amount of the user's face image to the authentication determiner 186. The authentication determiner 186 transmits the received feature amount of the user's face image to the authentication information updater 188 illustrated in FIG. 20. The authentication information updater 188 updates the feature amount of the user's face image stored in the registration information associated with the type of biometric information "face" in the table of the biometric information database for authentication 171A illustrated in FIG. 21A by adding the received feature amount of the user's face image to the feature amount of the user's face image stored in the registration information (Step S618). The authentication determiner 186 returns to Step S601 and performs the steps of Step S601 and thereafter.

Further, when fingerprint authentication is not successful (Step S617; NO), the authentication determiner 186 causes the authentication result display 187 illustrated in FIG. 20 to display on the display 19 that the authentication is not successful. Subsequently, the authentication determiner 186 causes the authentication result display 187 illustrated in FIG. 20 to display a login screen on the display 19 (Step S619).

Figure 22B:
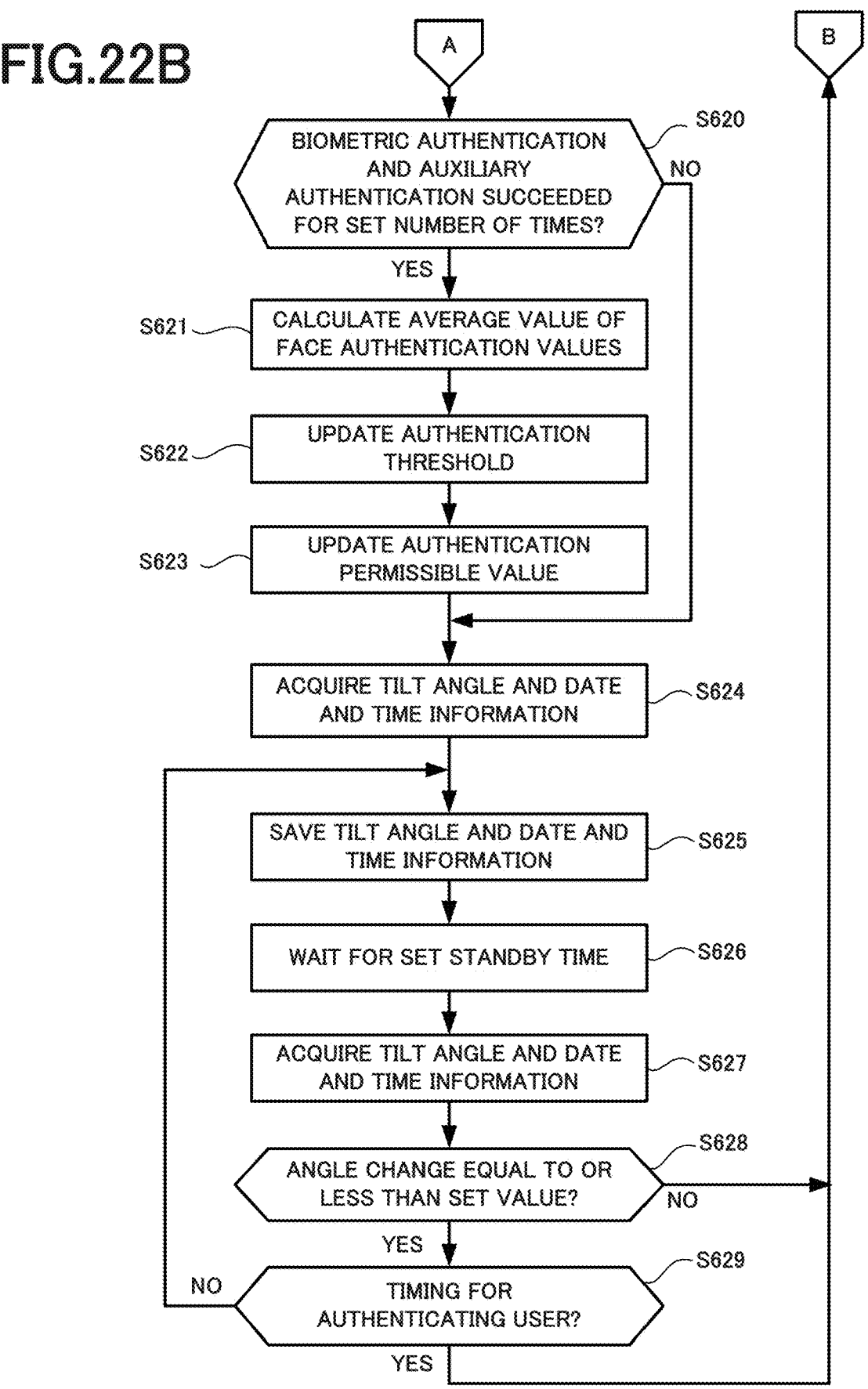
FIG. 22B is a flowchart that is a continuation of the authentication processing flowchart illustrated in FIG. 22A.

Then, the processing proceeds to FIG. 22B. The authentication determiner 186 judges whether or not the biometric authentication and the auxiliary authentication have succeeded for a predetermined set number of times (Step S620). The set number of times is an arbitrary number of times, for example, 10 times in a row, 20 times in total after the mobile terminal 1 is activated, and the like. When the biometric authentication and the auxiliary authentication have succeeded for the predetermined set number of times (Step S620; YES), the authentication determiner 186 calculates the average value of the face authentication values obtained from the set number of authentication (Step S621). Specifically, the authentication determiner 186 acquires the biometric information database for authentication 171A illustrated in FIG. 19 from the terminal storage 17A. The authentication determiner 186 acquires the average value of authentication values associated with the "face" among the types of biometric information from the table of the biometric information database for authentication 171A illustrated in FIG. 21A. The authentication determiner 186 adds the face authentication value obtained at Step S605 and the average value of the authentication values acquired from the biometric information database for authentication 171A and divides the result by two to calculate the average value of the face authentication values. If biometric authentication and auxiliary authentication have not succeeded for a predetermined set number of times (Step S620; NO), the processing skips Steps S621 to S623 and proceeds to Step S624.

The authentication determiner 186 transmits the average value of the face authentication values calculated at Step S621 to the authentication information updater 188. The authentication information updater 188 compares the received average value of the face authentication values with a predetermined upper limit value of the authentication threshold. When the average value of the face authentication values is equal to or greater than the predetermined upper limit value of the authentication threshold, the authentication information updater 188 writes and updates the upper limit value of the authentication threshold in the authentication threshold associated with "face" among the types of biometric information in the table of the biometric information database for authentication 171A illustrated in FIG. 21A. When the average value of the face authentication values is equal to or less than the predetermined upper limit value of the authentication threshold, the authentication information updater 188 writes and updates the average value of the face authentication values calculated at Step S621 in the authentication threshold associated with the "face" among the types of biometric information in the table of biometric information database for authentication 171A illustrated in FIG. 21A (Step S622).

Next, the authentication information updater 188 updates the authentication permissible value (Step S623). Specifically, when the average value of the face authentication values calculated at step S621 is equal to or greater than the preset upper limit value of authentication threshold, the authentication information updater 188 uses the preset maximum authentication permissible value as the authentication permissible value. Further, when the average value of the face authentication values calculated at Step S621 is equal to or less than the preset upper limit value of the authentication threshold, if the sum of the average value of the face authentication values calculated at step S621 and the default authentication permissible range value is equal to or less than the maximum authentication permissible value, the sum is regarded as the authentication permissible value. If the sum of the average value of the face authentication values calculated at step S621 and the default authentication permissible range value is equal to or greater than the maximum authentication permissible value, the maximum authentication permissible value is regarded as the authentication permissible value. The authentication information updater 188 acquires the biometric information database for authentication 171A illustrated in FIG. 19 from the terminal storage 17A. The authentication information updater 188 writes and updates the obtained authentication permissible value in the authentication permissible value associated with the "face" among the types of biometric information in the table of the biometric information database for authentication 171A illustrated in FIG. 21A.

The authentication information acquirer 185 illustrated in FIG. 20 acquires the tilt angle of the mobile terminal 1 from the tilt detector 13. Subsequently, the authentication information acquirer 185 acquires the current date and time information from a timer (not illustrated) (Step S624). The authentication information acquirer 185 transmits the acquired tilt angle of the mobile terminal 1 and the current date and time information to the authentication determiner 186. The authentication determiner 186 transmits the received tilt angle of the mobile terminal 1 and the current date and time information to the authentication information updater 188. The authentication information updater 188 writes and saves the received tilt angle of the mobile terminal 1 and the current date and time information in the tilt information table 177 stored in the terminal storage 17A illustrated in FIG. 19 (Step S625).

The authentication determiner 186 acquires the standby time stored in the table of the tilt information table 177 illustrated in FIG. 21C. The authentication determiner 186 transmits the acquired standby time to the authentication information acquirer 185. The authentication information acquirer 185 waits for data acquisition from the near field communicator 10, the imager 11, and the like during the received standby time (Step S626). When the standby time ends, the authentication information acquirer 185 acquires the tilt angle of the mobile terminal 1 from the tilt detector 13. Subsequently, the authentication information acquirer 185 acquires the current date and time information from the timer (not illustrated) (Step S627). The authentication information acquirer 185 transmits the acquired tilt angle of the mobile terminal 1 and the current date and time information to the authentication determiner 186.

The authentication determiner 186 acquires the angle of the mobile terminal 1 stored in the table of the tilt information table 177 illustrated in FIG. 21C. The authentication determiner 186 compares the tilt angle of the mobile terminal 1 received from the authentication information acquirer 185 with the angle of the mobile terminal 1 acquired from the tilt information table 177, and determines whether or not the angle has changed (Step S628). When the change in the angle of the mobile terminal 1 is the angle of a predetermined set value, for example, 30 degrees or more (Step S628; NO), the authentication determiner 186 judges that the mobile terminal 1 has been moved by the user to perform some operation, and the processing returns to Step S601 illustrated in FIG. 22A. Thereafter, the authentication determiner 186 performs the processing of Step S601 and thereafter.

Further, when the change in the angle of the mobile terminal 1 is equal to or less than the angle of the predetermined set value (Step S628; YES), the authentication determiner 186 judges that the mobile terminal 1 has not been moved by the user. Subsequently, the authentication determiner 186 determines whether or not it is the timing to authenticate the user (Step S629). The timing for authenticating the user is the timing at which the preset authentication interval time has elapsed. When it is the timing to authenticate the user (Step S629; YES), the authentication determiner 186 returns to Step S601 illustrated in FIG. 22A. Thereafter, the authentication determiner 186 performs the processing of Step S601 and thereafter. If it is not the timing to authenticate the user (Step S629; NO), the authentication determiner 186 returns to Step S625. The authentication determiner 186 performs processing from Steps S625 to S629.

Note that, in the above embodiment, when the authentication value obtained from biometric information and the authentication threshold are the same, whether or not the authentication is successful may be determined based on either the authentication value obtained from biometric information is equal to or greater than the authentication threshold or the authentication value obtained from biometric information is equal to or less than the authentication threshold. When the authentication value obtained from the biometric information and the authentication permissible value are the same, whether or not the authentication is successful may be determined based on either the authentication value obtained from the biometric information is equal to or greater than the authentication threshold or the authentication value obtained from the biometric information is equal to or less than the authentication threshold.

As described above, the authentication processing executed by the mobile terminal 1 according to Embodiment 5 authenticates the user based on user habit data when the result of authentication of the user who uses the mobile terminal 1 based on biometric information is a gray zone in which whether or not the user is an authentic user cannot be clearly determined. In this way, a user can be authenticated based on user habit data even when whether or not the user who uses the mobile terminal 1 is an authentic user cannot be clearly determined based on biometric information. In addition, authentication system can be improved by executing the user authentication processing that is performed in the mobile terminal 1 in the background, as well as, updating the user's biometric information and the user's habit while the mobile terminal 1 is in operation. As the result, security can be ensured at the same time reducing the operational burden on the user.

Modification Example 1

In the above-described Embodiments 1 to 5, the control target device has been described as the vehicle 5 for facilitating understanding. However, the control target device is not limited to the vehicle 5, and may be any device, such as various home appliances, a smart home, a personal computer (PC), and a robot.

Modification Example 2

In the above-described Embodiments 1 to 5, the biometric information and the user habit data registered in the mobile terminal 1 for calculating the score values illustrated in FIGS. 3D and 13 may be updated every time the user is authenticated to improve the accuracy. Further, the values set in the item of the score value in the score value table 173 illustrated in FIG. 3D and the score value table 173A illustrated in FIG. 13 may be set by a user as necessary.

Modification Example 3

In the above-described Embodiments 1 to 5, the user authentication processing is realized by executing the authentication processing program 170 illustrated in FIG. 2B or the authentication processing program 170A illustrated in FIG. 19. All of or some steps performed by the authentication processing program 170 or the authentication processing program 170A may be realized by a circuit configured by a semiconductor chip, such as an application specific integrated circuit (ASIC) and a system large-scale integration (LSI), and various circuit elements.

Note that, although, in the above-described Embodiments 1 to 5, terms "save", "register", "record", and "store" are used, these terms are used synonymously.

Further, in Embodiments 1 to 5 of the present disclosure, the main terminal 1A and the sub-terminal 1B can be realized by using a general computer system without relying on a dedicated system. For example, a program for realizing each function in the main terminal 1A and the sub-terminal 1B may be stored in a recording medium, such as a computer-readable compact disc read only memory (CD-ROM) and a digital versatile disc read only memory (DVD-ROM), and distributed, and a computer may be configured to realize the above-described function by installing this program. When each function is realized by shared operation of the operating system (OS) and an application, or by cooperation of the OS and the application, only the application may be stored in the recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-086866, filed on Apr. 26, 2019, the entire disclosure of which is incorporated by reference herein.

INDUSTRIAL APPLICABILITY

The present disclosure can be preferably used for electronic control systems.

REFERENCE SIGNS LIST

1 Mobile terminal
1A Main terminal
1B Sub-terminal
5 Vehicle
10 Near field communicator
11A In-camera
12 Audio input/output
12A Speaker
12B Call microphone
13 Tilt detector
14 Operation inputter
15 Fingerprint detector
15A Left fingerprint sensor
15B Right fingerprint sensor
16 Position detector
17 Terminal storage
18 Terminal controller
19 Display
20 Telephone communicator
21 Processor
22 Memory
23 Display controller
24 Display device
25 I/O ports
26 Storage
27 Near field communication device
28 Data bus
100-102 Electronic control system

The invention claimed is:

1. A remote control device comprising:
an authenticator that automatically acquires biometric information of a user and authenticates the user based on the biometric information and comparing an operation mode of a terminal by the user, the authenticator comprising:
a first authenticator that performs authentication based on first biometric information and the operation mode of the terminal by the user, and
a second authenticator that performs authentication based on second biometric information that is different from the first biometric information;
a receiver that receives a first instruction for a control target device from the user; and
a transmitter that, when authentication by the authenticator is successful, transmits a first signal indicating the first instruction received by the receiver to the control target device, the transmitter configured to be able to transmit a second signal indicating a second instruction comprising a more limited content when authenticated by the second authenticator than when authenticated by the first authenticator.

2. The remote control device according to claim 1, wherein the authenticator determines a usage mode of the user who operates the remote control device, accumulates information of the usage mode, and authenticates the user based on an operation mode at time of use and the accumulated information of the usage mode.

3. The remote control device according to claim 1, wherein the authenticator authenticates a user as a valid user when a sum of an authentication score value based on biometric information acquired from the user and a score value based on a usage mode is equal to or greater than a predetermined total value.

4. The remote control device according to claim 1, further comprising:
a setter that sets an authority within which the remote control device is able to instruct in accordance with a third instruction from a second remote control device,
wherein the transmitter transmits a third signal indicating a fourth instruction to control a same control target device as the second remote control device to the same control target device, based on the authority set by the setter.

5. The remote control device according to claim 1, further comprising:
an authority notifier that notifies a second remote control device of an authority within which the remote control device is able to instruct,
wherein the transmitter transmits a third signal indicating a third instruction to control a same control target device as the second remote control device to the same control target device, based on the authority notified by the authority notifier.

6. The remote control device according to claim 2, wherein the authenticator authenticates a user as a valid user when a sum of an authentication score value based on biometric information acquired from the user and a score value based on a usage mode is equal to or greater than a predetermined total value.

7. The remote control device according to claim 5, wherein the authenticator authenticates a user as a valid user when a sum of an authentication score value based on biometric information acquired from the user and a score value based on a usage mode is equal to or greater than a predetermined total value.

8. The remote control device according to claim 2, further comprising:
   a setter that sets an authority within which the remote control device is able to instruct in accordance with a third instruction from a second remote control device,
   wherein the transmitter transmits a third signal indicating a fourth instruction to control a same control target device as the second remote control device to the same control target device, based on the authority set by the setter.

9. The remote control device according to claim 6, further comprising:
   a setter that sets an authority within which the remote control device is able to instruct in accordance with a third instruction from a second remote control device,
   wherein the transmitter transmits a third signal indicating a fourth instruction to control a same control target device as the second remote control device to the same control target device, based on the authority set by the setter.

10. The remote control device according to claim 3, further comprising:
    a setter that sets an authority within which the remote control device is able to instruct in accordance with a third instruction from a second remote control device,
    wherein the transmitter transmits a third signal indicating a fourth instruction to control a same control target device as the second remote control device to the same control target device, based on the authority set by the setter.

11. The remote control device according to claim 2, further comprising:
    an authority notifier that notifies a second remote control device of an authority within which the remote control device is able to instruct,
    wherein the transmitter transmits a third signal indicating a third instruction to control a same control target device as the second remote control device to the same control target device, based on the authority notified by the authority notifier.

12. The remote control device according to claim 6, further comprising:
    an authority notifier that notifies a second remote control device of an authority within which the remote control device is able to instruct,
    wherein the transmitter transmits a third signal indicating a third instruction to control a same control target device as the second remote control device to the same control target device, based on the authority notified by the authority notifier.

13. The remote control device according to claim 3, further comprising:
    an authority notifier that notifies a second remote control device of an authority within which the remote control device is able to instruct,
    wherein the transmitter transmits a third signal indicating a third instruction to control a same control target device as the second remote control device to the same control target device, based on the authority notified by the authority notifier.

14. The remote control device according to claim 4, further comprising:
    an authority notifier that notifies a third remote control device of an authority within which the remote control device is able to instruct,
    wherein the transmitter transmits a fourth signal indicating a fifth instruction to control a same control target device as the third remote control device to the same control target device, based on the authority notified by the authority notifier.

* * * * *